(12) United States Patent
Kimura

(10) Patent No.: US 11,372,219 B2
(45) Date of Patent: Jun. 28, 2022

(54) ZOOM LENS AND IMAGE PICKUP APPARATUS HAVING THE SAME

(71) Applicant: CANON KABUSHIKI KAISHA, Tokyo (JP)

(72) Inventor: Kohei Kimura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 125 days.

(21) Appl. No.: 16/985,890

(22) Filed: Aug. 5, 2020

(65) Prior Publication Data

US 2021/0096343 A1    Apr. 1, 2021

(30) Foreign Application Priority Data

Sep. 27, 2019    (JP) .............................. JP2019-177968

(51) Int. Cl.
   *G02B 15/14*    (2006.01)
   *H04N 5/232*    (2006.01)
   *G02B 13/00*    (2006.01)
(52) U.S. Cl.
   CPC .... *G02B 15/144115* (2019.08); *G02B 13/009* (2013.01); *H04N 5/23238* (2013.01)

(58) Field of Classification Search
   CPC ............ G02B 15/1425; G02B 15/1435; G02B 15/143507; G02B 15/144515; G02B 15/145531
   See application file for complete search history.

(56) References Cited

U.S. PATENT DOCUMENTS 7,280,284 B2 * 10/2007 Ishii ....................... G02B 13/06
                                                       359/691
8,947,786 B2    2/2015 Tomioka

FOREIGN PATENT DOCUMENTS

JP    2017122744 A    7/2017
WO    2012153505 A1    11/2012

* cited by examiner

*Primary Examiner* — Joseph P Martinez
(74) *Attorney, Agent, or Firm* — Rossi, Kimms & McDowell LLP

(57) ABSTRACT

A zoom lens consisting of, in order from an object side to an image side, a first lens unit having a negative refractive power, and a rear lens unit having one or more lens units and having a positive refractive power as a whole. Intervals between adjacent lens units change during zooming. The first lens unit has at least three meniscus lenses each having a negative refractive power and a convex shape toward the object side. At least one of the at least three meniscus lenses includes an aspherical surface having a positive aspherical amount. A predetermined condition is satisfied.

14 Claims, 11 Drawing Sheets

ZOOM LENS AND IMAGE PICKUP APPARATUS HAVING THE SAME

BACKGROUND OF THE INVENTION

Field of the Invention

The present invention relates to zoom lens, such as one suitable for an image pickup apparatus, for example a digital camera, a video camera, a broadcasting camera, a surveillance camera, and a film-based camera.

Description of the Related Art

Zoom lenses having a wide angle of view and a high optical performance have recently been required as an imaging optical system for an image pickup apparatus. A negative lead lens is known as a zoom lens having a wide angle of view at a wide-angle end.

PCT International Publication No. 2012/153505 discloses a zoom lens that includes, in order from an object side to an image side, a first lens unit having a negative refractive power and a second lens unit having a positive refractive power wherein a distance between adjacent lens units narrows during zooming. Japanese Patent Laid-Open No. 2017-122744 discloses a zoom lens that includes, in order from the object side to the image side, first to fourth lens units having negative, positive, positive, and positive refractive powers, wherein intervals between respective lens units change during zooming.

However, the zoom lens disclosed in PCT International Publication No. 2012/153505 sets a focal length of the first lens unit to be small in order to widen the angle of view, and thus cannot sufficiently correct the distortion at the wide-angle end. The zoom lens disclosed in Japanese Patent Laid-Open No. 2017-122744 does not properly set the refractive power of the aspherical lens relative to the refractive power of the first lens unit or the position of the aspheric lens, and thus cannot sufficiently correct the distortion. In addition, the thickness of the first lens unit is too large for a compact structure.

SUMMARY OF THE INVENTION

The present invention provides a compact zoom lens having a wide angle of view and a high optical performance in the entire zoom range, and an image pickup apparatus having the same.

A zoom lens according to the present invention consists of, in order from an object side to an image side, a first lens unit having a negative refractive power, and a rear lens unit having one or more lens units and having a positive refractive power as a whole. Intervals between adjacent lens units change during zooming. The first lens unit has at least three meniscus lenses each having a negative refractive power and a convex shape toward the object side. At least one of the at least three meniscus lenses includes an aspherical surface having a positive aspherical amount. The following conditional expressions are satisfied:

$$2.85 < D1/skw < 10.00$$

$$-20.0 < TTDw/f1 < -6.2$$

where D1 is a thickness of the first lens unit on an optical axis, skw is a distance on the optical axis from a surface closest to an image plane of the zoom lens to the image plane at a wide-angle end, TTDw is a distance on the optical axis from a surface closest to an object of the zoom lens to the image surface at the wide-angle end, and f1 is a focal length of the first lens unit.

An image pickup apparatus having the above zoom lens also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention. A zoom lens (imaging optical system) according to each example includes, in order from an object side to an image side, a first lens unit having a negative refractive power and a rear unit having a positive refractive power (one or more rear units having a positive power as a whole), wherein intervals between adjacent lens units change during zooming.

Figure 1:
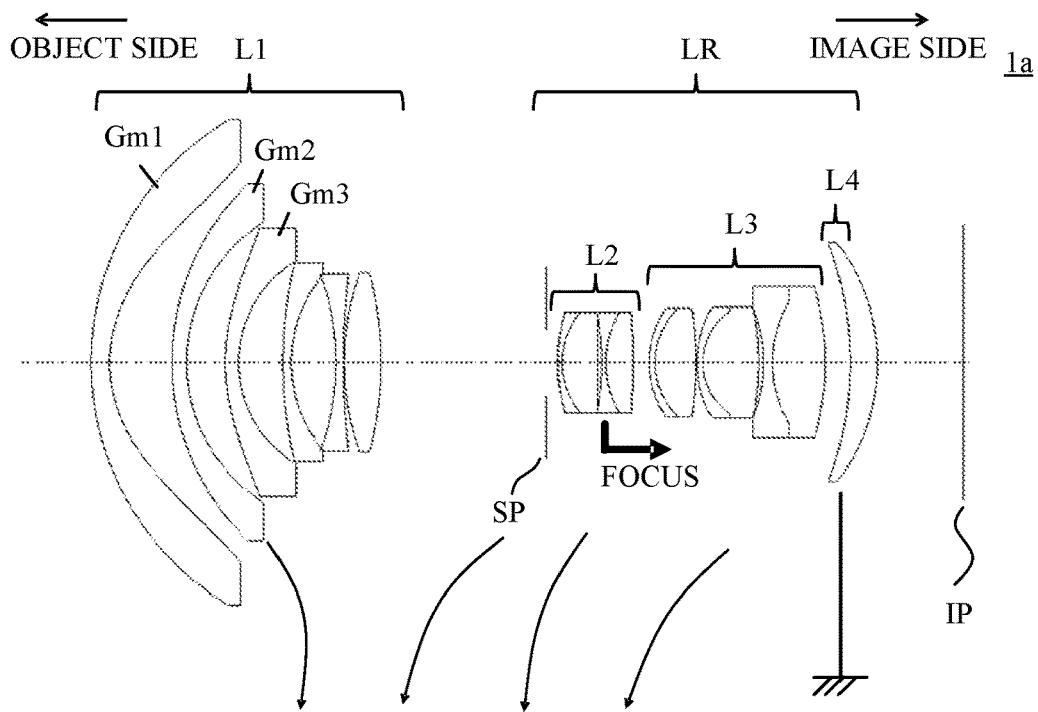
FIG. 1 is a sectional view of a zoom lens according to Example 1 at a wide-angle end.
Figure 2A:
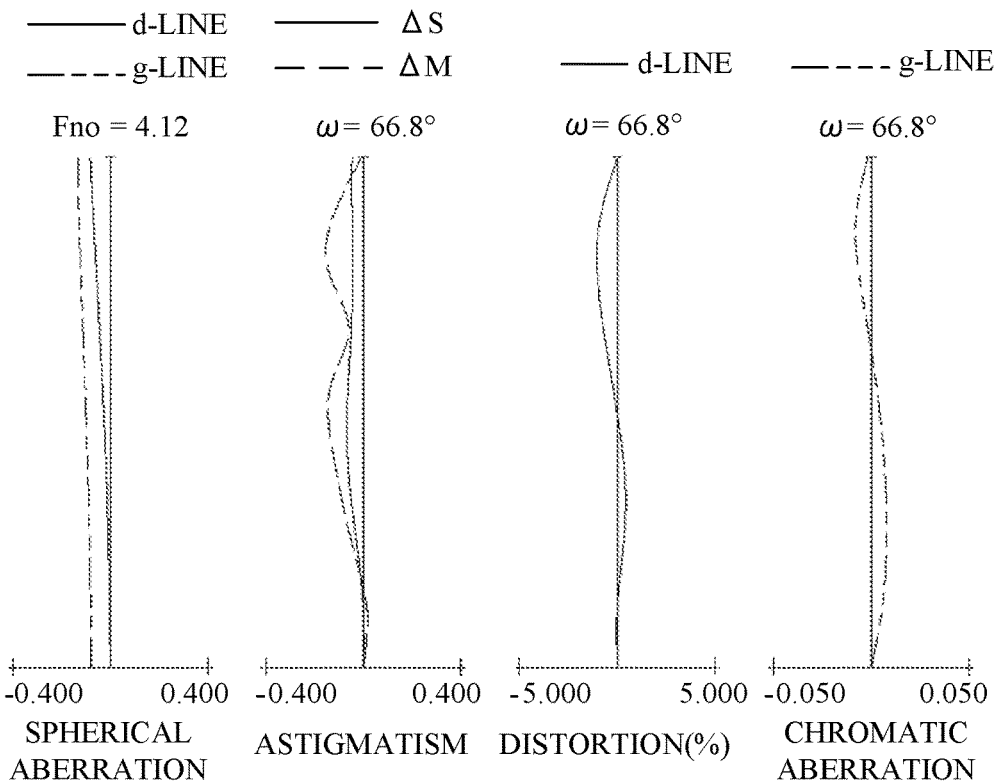
FIGS. 2A to 2C are aberration diagrams of the zoom lens according to Example 1 at the wide-angle end, a middle zoom position, and a telephoto end.
Figure 2B:
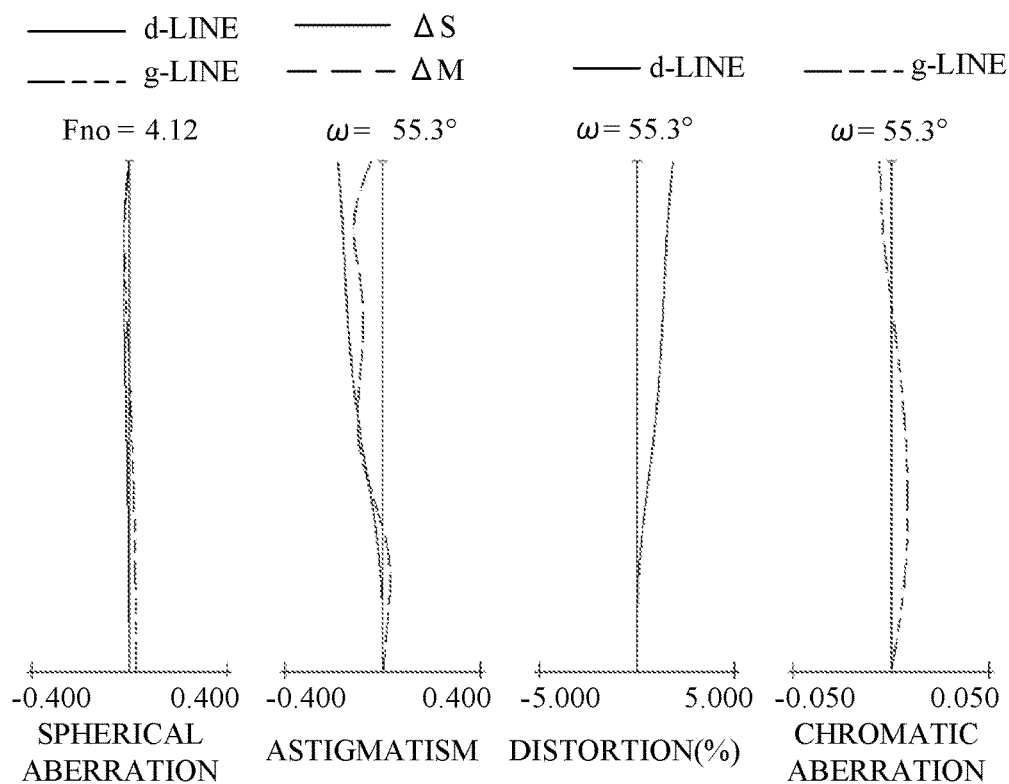
Figure 2C:
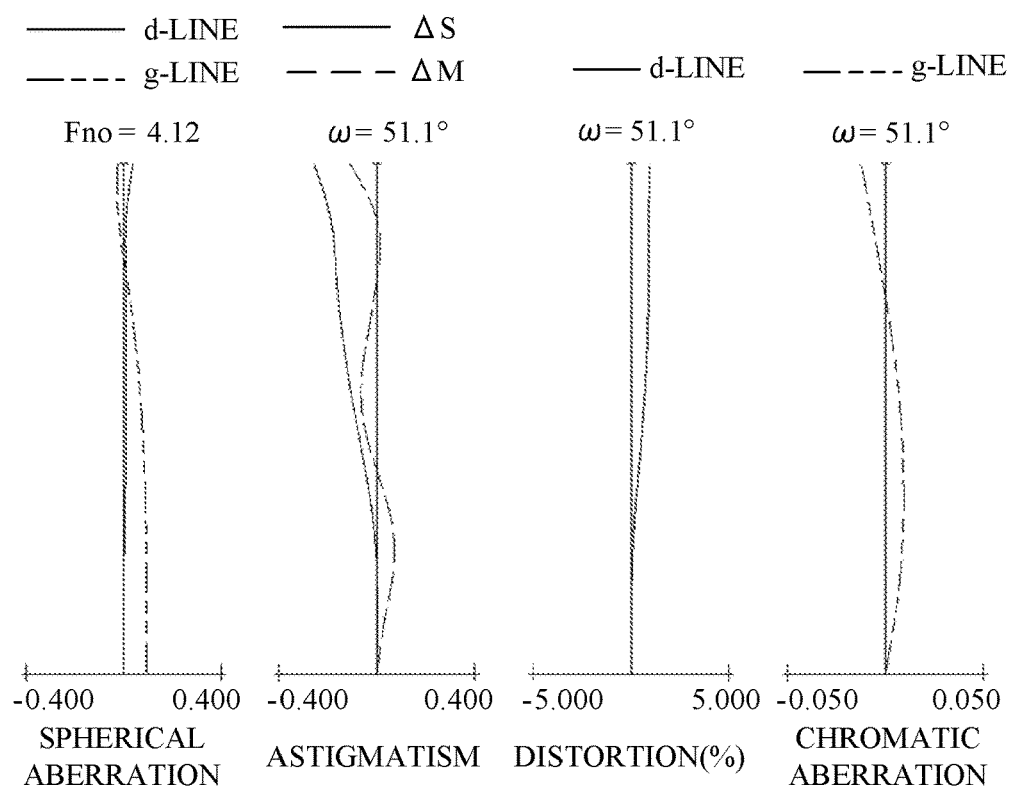

FIG. 1 is a sectional view of a zoom lens 1a according to Example 1 of the present invention which is focused on an object at infinity. FIGS. 2A to 2C are longitudinal aberration diagrams at a wide-angle end, a middle zoom position, and a telephoto end of the zoom lens 1a, respectively. The zoom lens 1a is a zoom lens having a zoom ratio of 1.8 times and an F-number of about 4.12. The total angle of view at the wide-angle end of the zoom lens 1a is 134 degrees, and the total angle of view at the telephoto end is 102 degrees.

Figure 3:
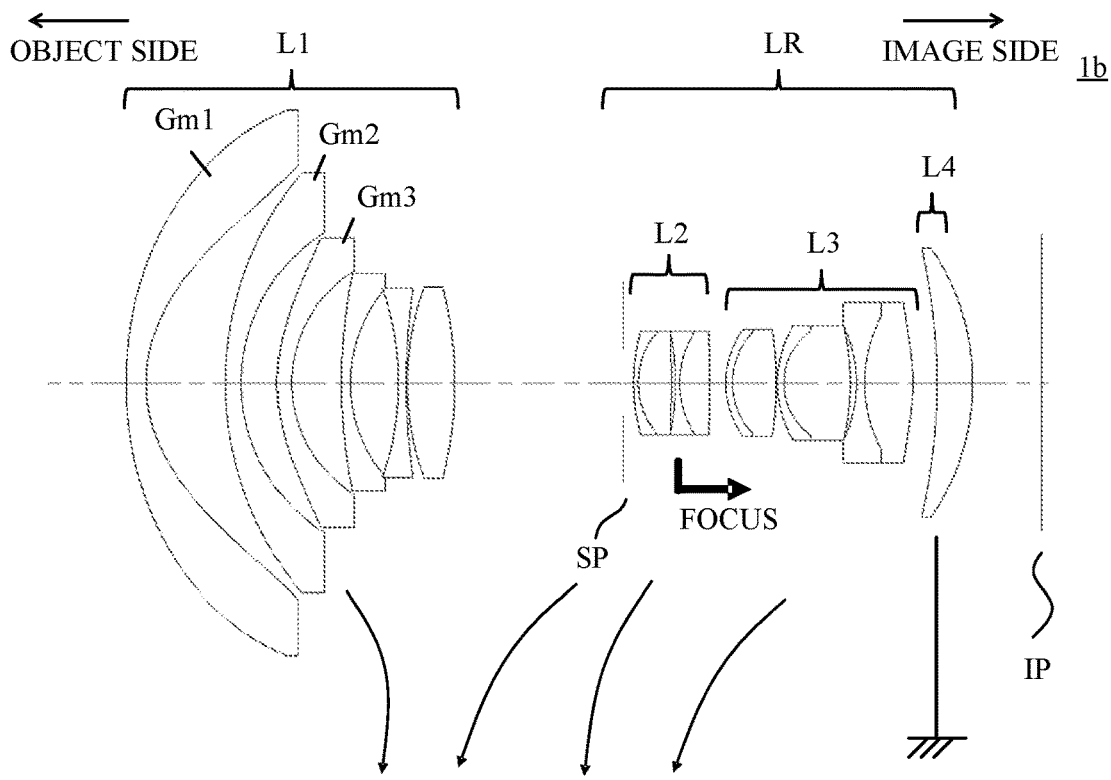
FIG. 3 is a sectional view of a zoom lens according to Example 2 at a wide-angle end.
Figure 4A:
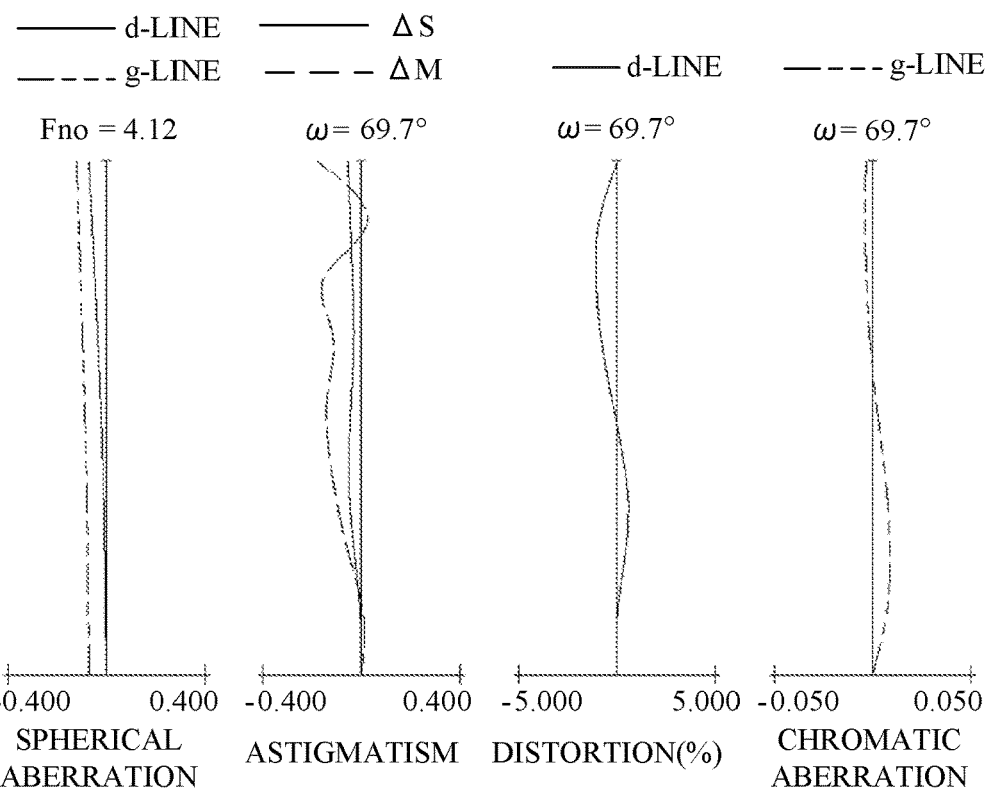
FIGS. 4A to 4C are aberration diagrams of the zoom lens according to Example 2 at the wide-angle end, a middle zoom position, and a telephoto end.
Figure 4B:
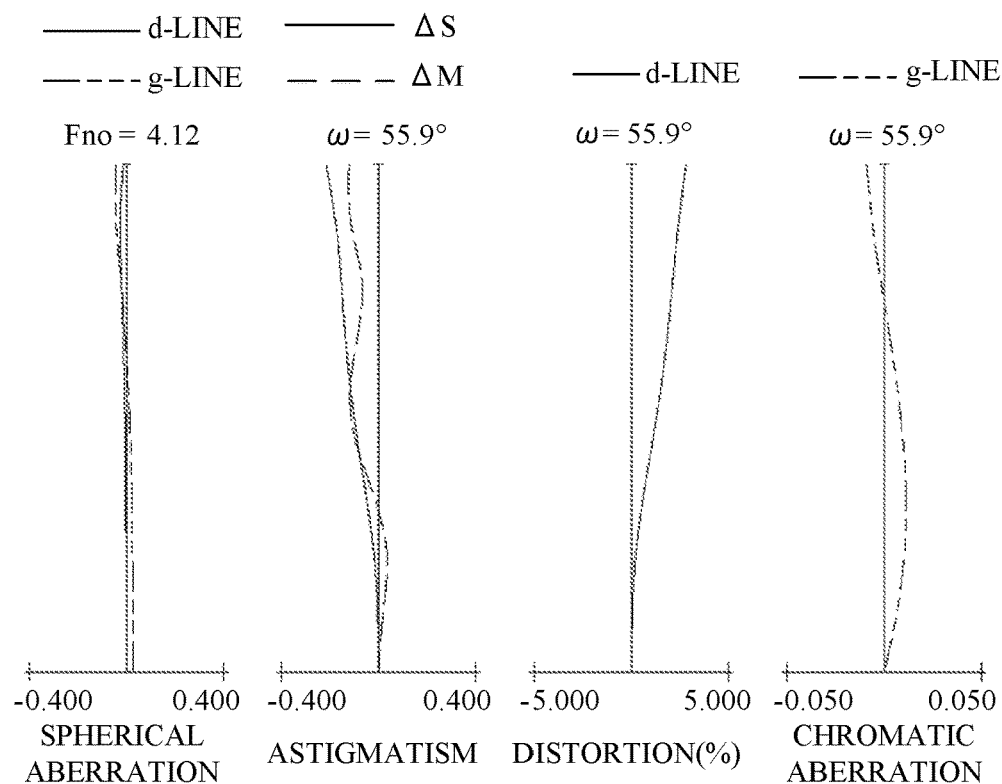
Figure 4C:
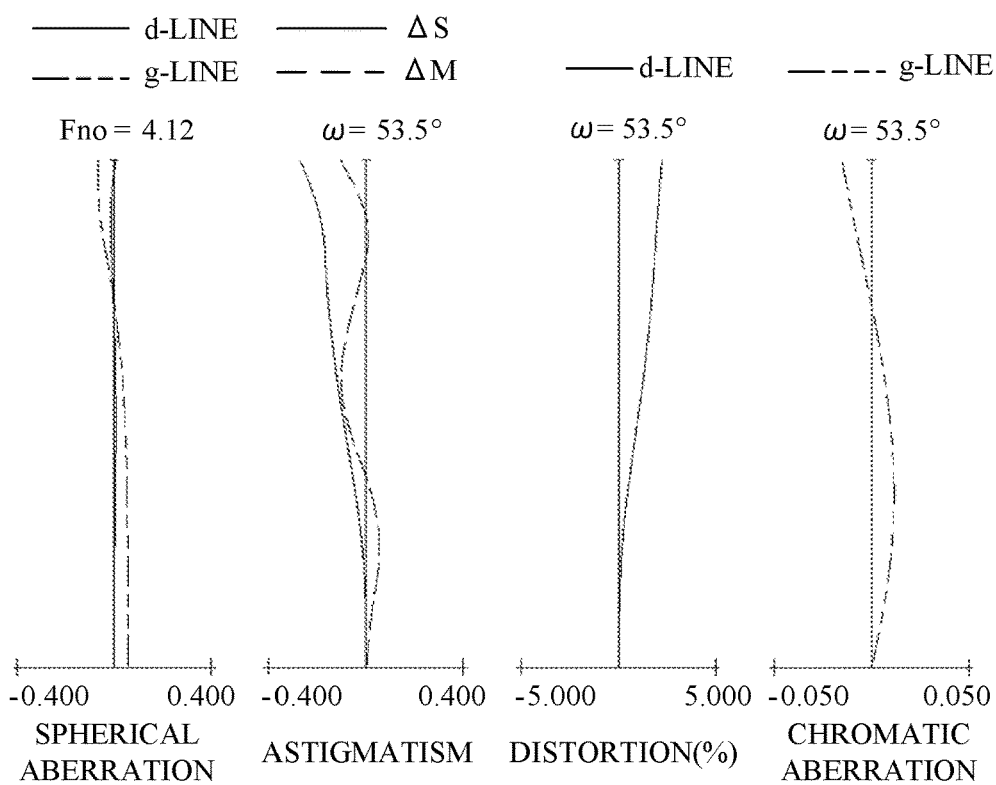

FIG. 3 is a sectional view of the zoom lens 1b according to Example 2 of the present invention which is focused on an object at infinity. FIGS. 4A to 4C are longitudinal aberration diagrams at a wide-angle end, a middle zoom position, and a telephoto end of the zoom lens 1b, respectively. The zoom lens 1b is a zoom lens having a zoom ratio of 2.0 and an F-number of about 4.12. The total angle of view at the wide-angle end of the zoom lens 1b is 139 degrees, and the total angle of view at the telephoto end is 107 degrees.

Figure 5:
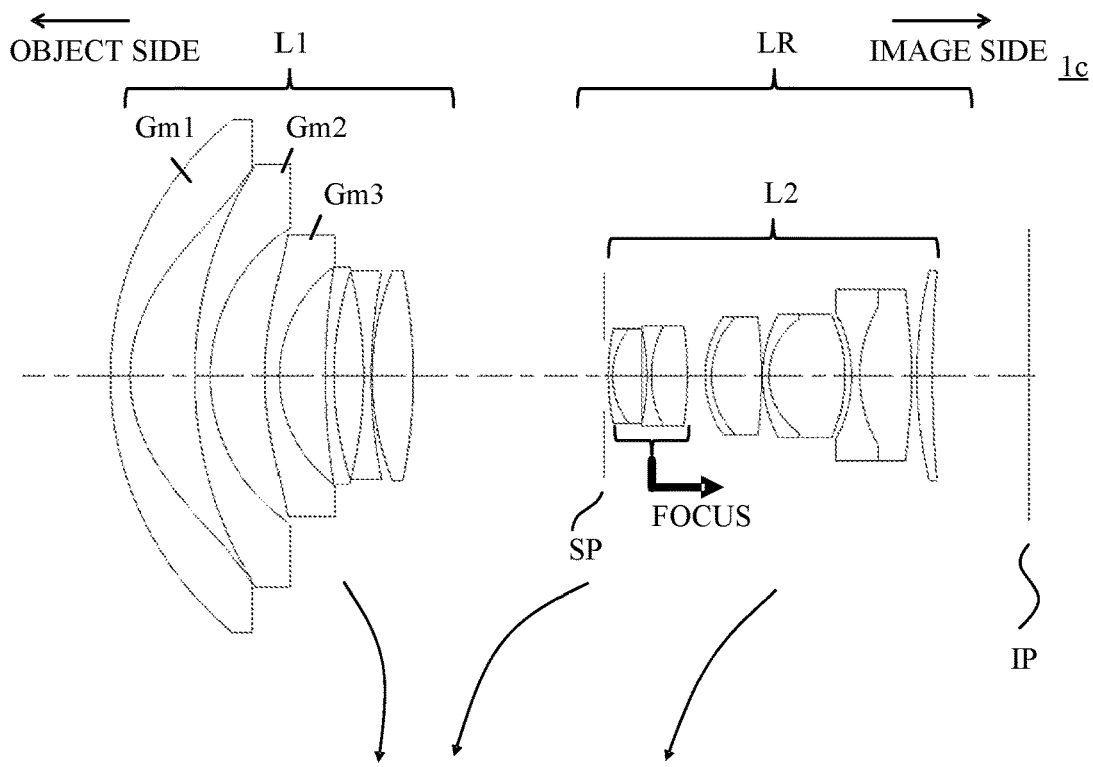
FIG. 5 is a sectional view of a zoom lens according to Example 3 at a wide-angle end.
Figure 6A:
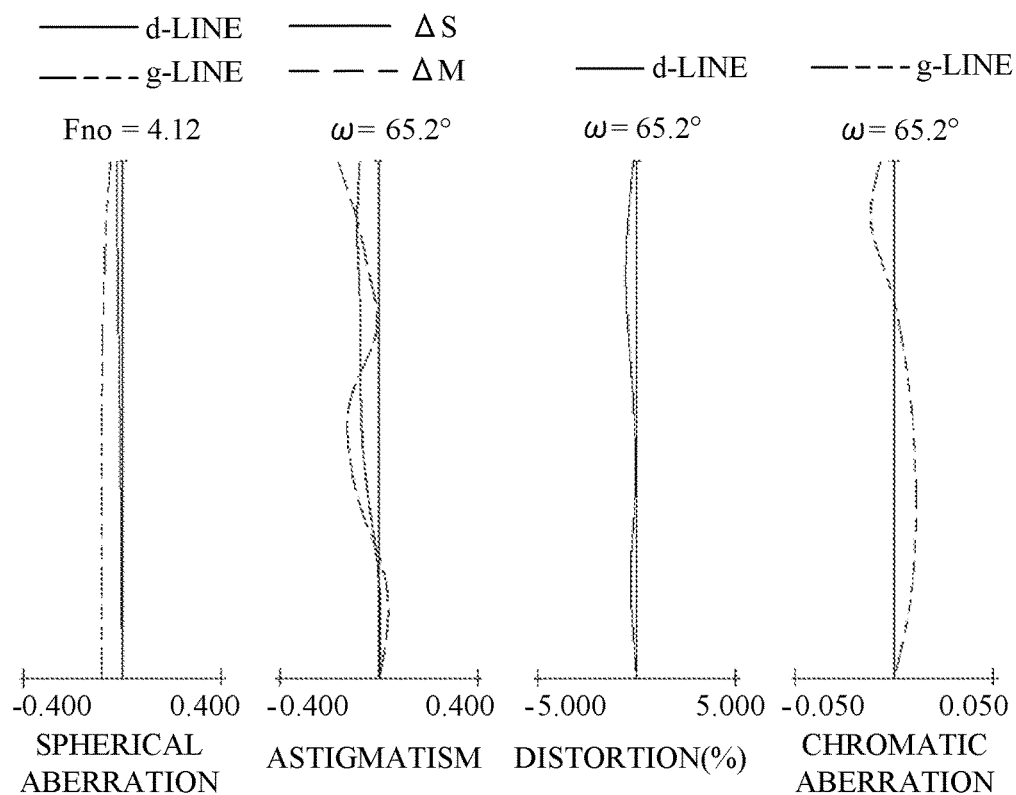
FIGS. 6A to 6C are aberration diagrams of the zoom lens according to Example 3 at the wide-angle end, a middle zoom position, and a telephoto end.
Figure 6B:
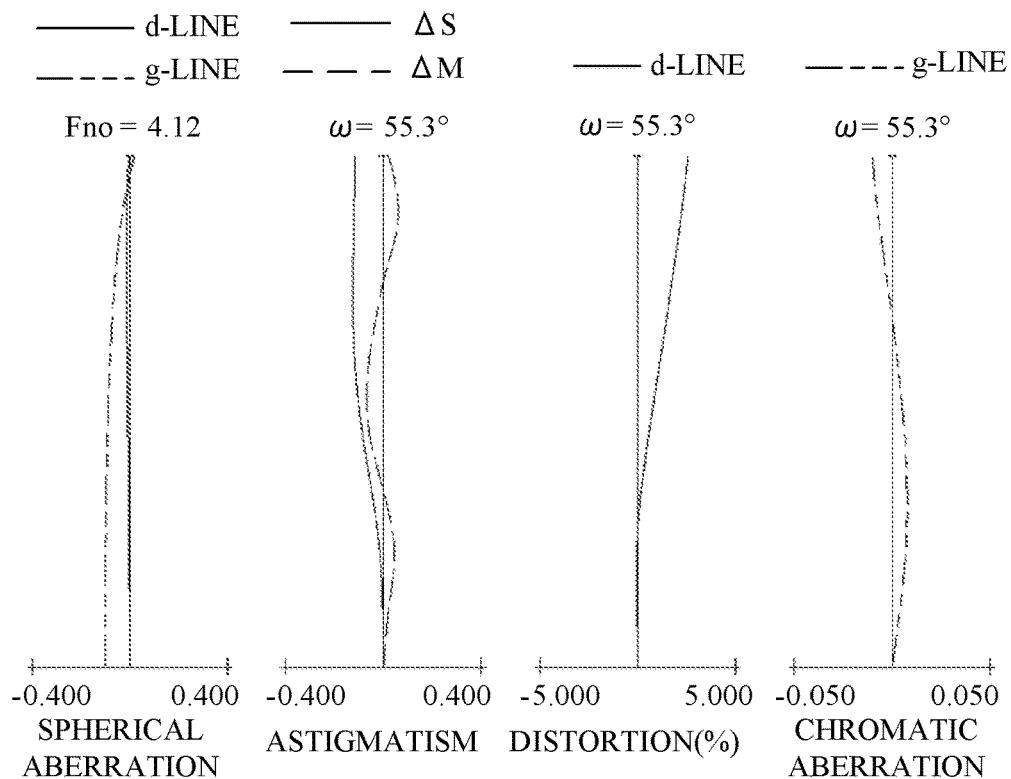
Figure 6C:
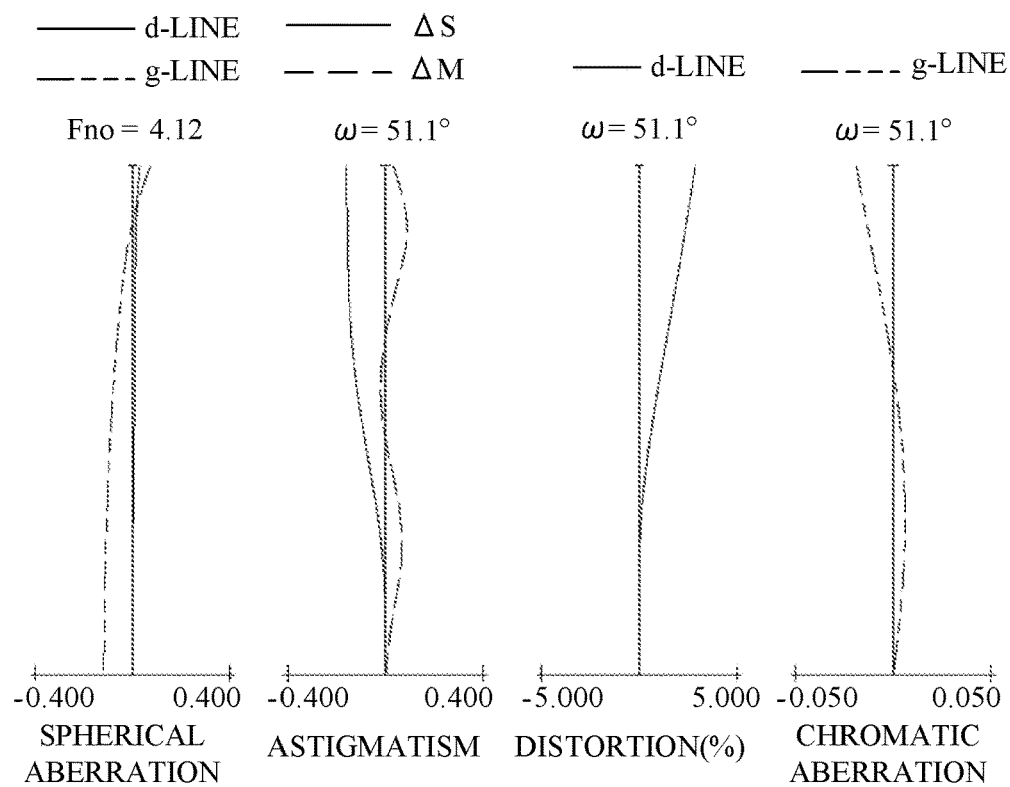

FIG. 5 is a sectional view of the zoom lens 1c according to Example 3 of the present invention which is focused on an object at infinity. FIGS. 6A to 6C are longitudinal aberration diagrams at a wide-angle end, a middle zoom position, and a telephoto end of the zoom lens 1c, respectively. The zoom lens 1c is a zoom lens having a zoom ratio of 1.75 and an F-number of about 4.12. The total angle of view at the wide-angle end of the zoom lens 1c is 130 degrees, and the total angle of view at the telephoto end is 102 degrees.

Figure 7:
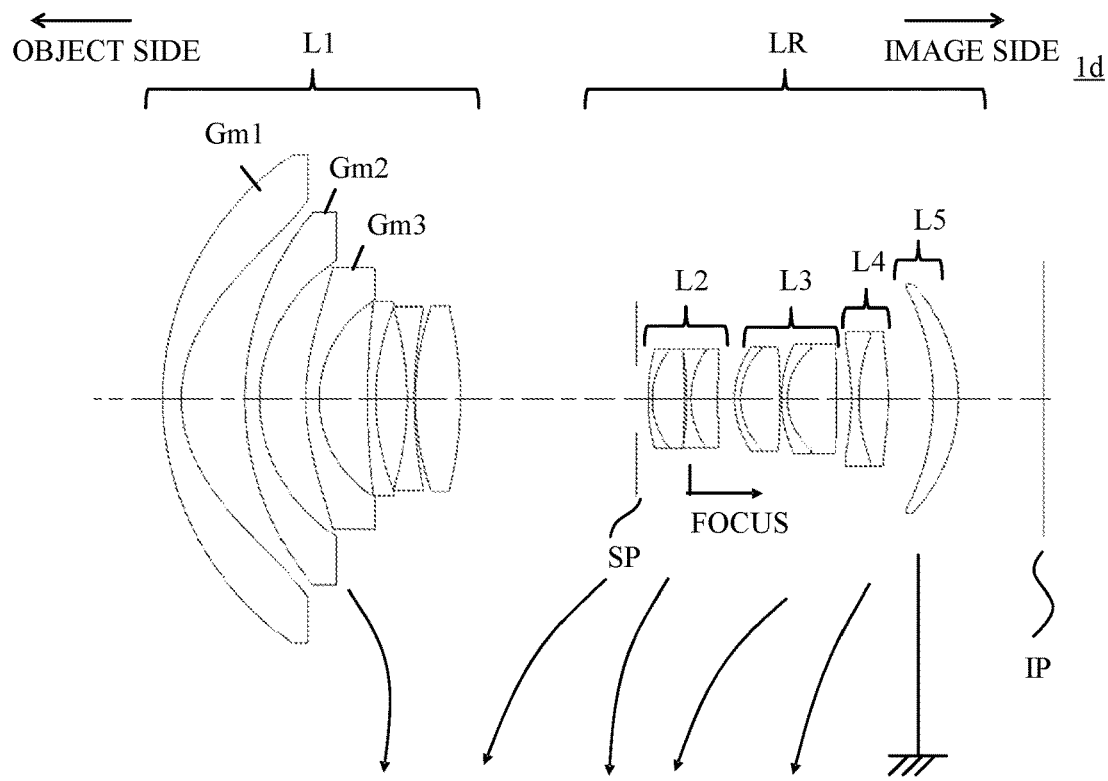
FIG. 7 is a sectional view of a zoom lens according to Example 4 at a wide-angle end.
Figure 8A:
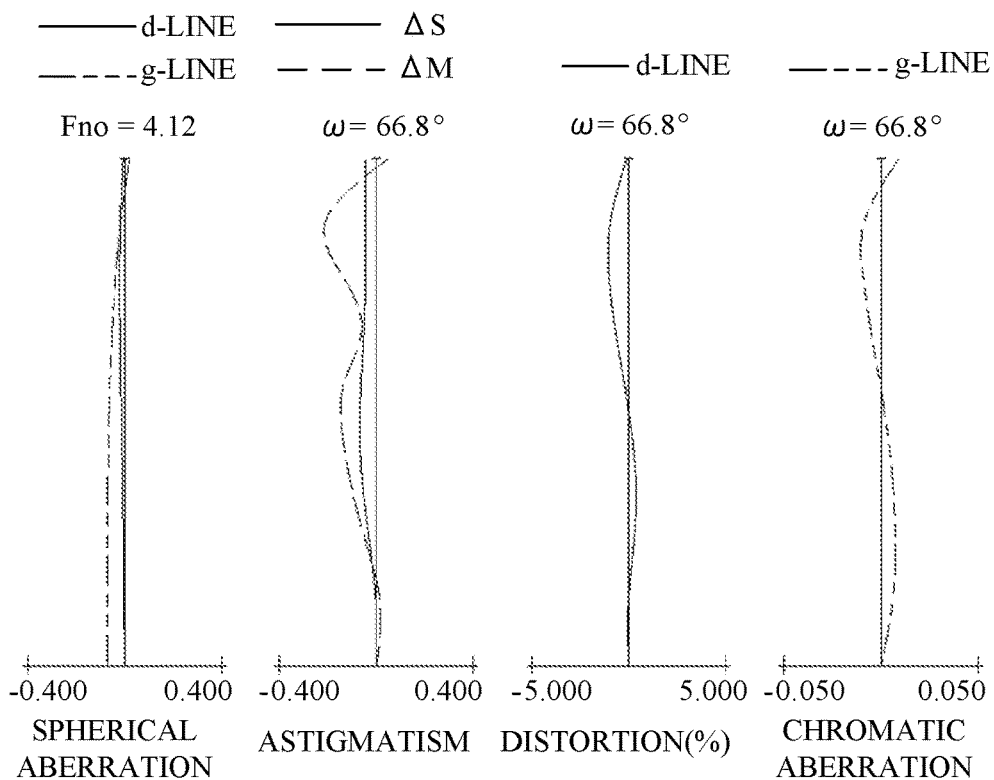
FIGS. 8A to 8C are aberration diagrams of the zoom lens according to Example 4 at the wide-angle end, a middle zoom position, and a telephoto end.
Figure 8B:
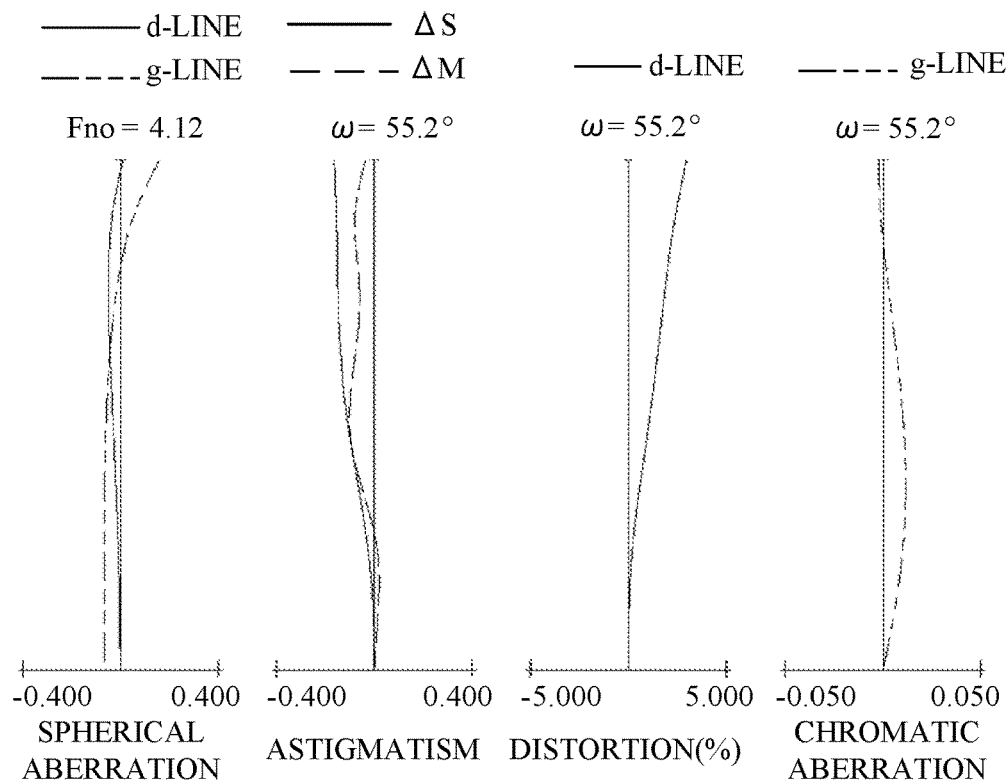
Figure 8C:
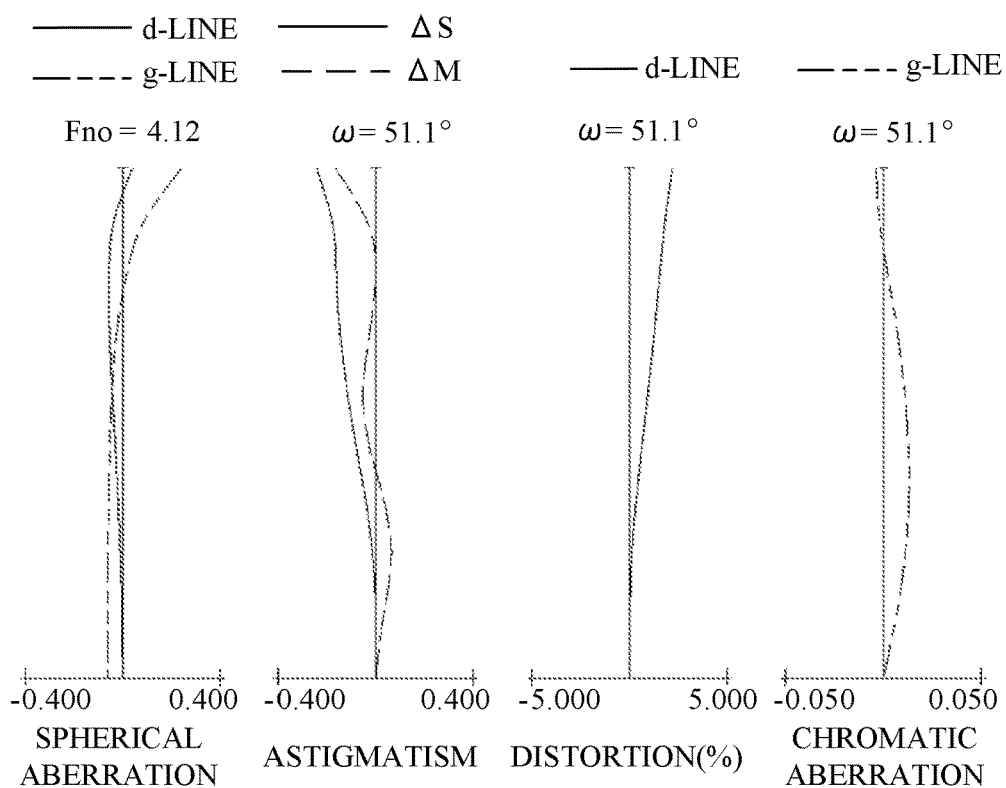

FIG. 7 is a sectional view of the zoom lens 1d according to Example 4 of the present invention which is focused on an object at infinity. FIGS. 8A to 8C are longitudinal aberration diagrams of the zoom lens 1d at a wide-angle end, a middle zoom position, and a telephoto end, respectively. The zoom lens 1d is a zoom lens having a zoom ratio of 1.88 and an F-number of about 4.12. The total angle of view at the wide-angle end of the zoom lens 1d is 134 degrees, and the total angle of view at the telephoto end is 102 degrees.

Figure 9:
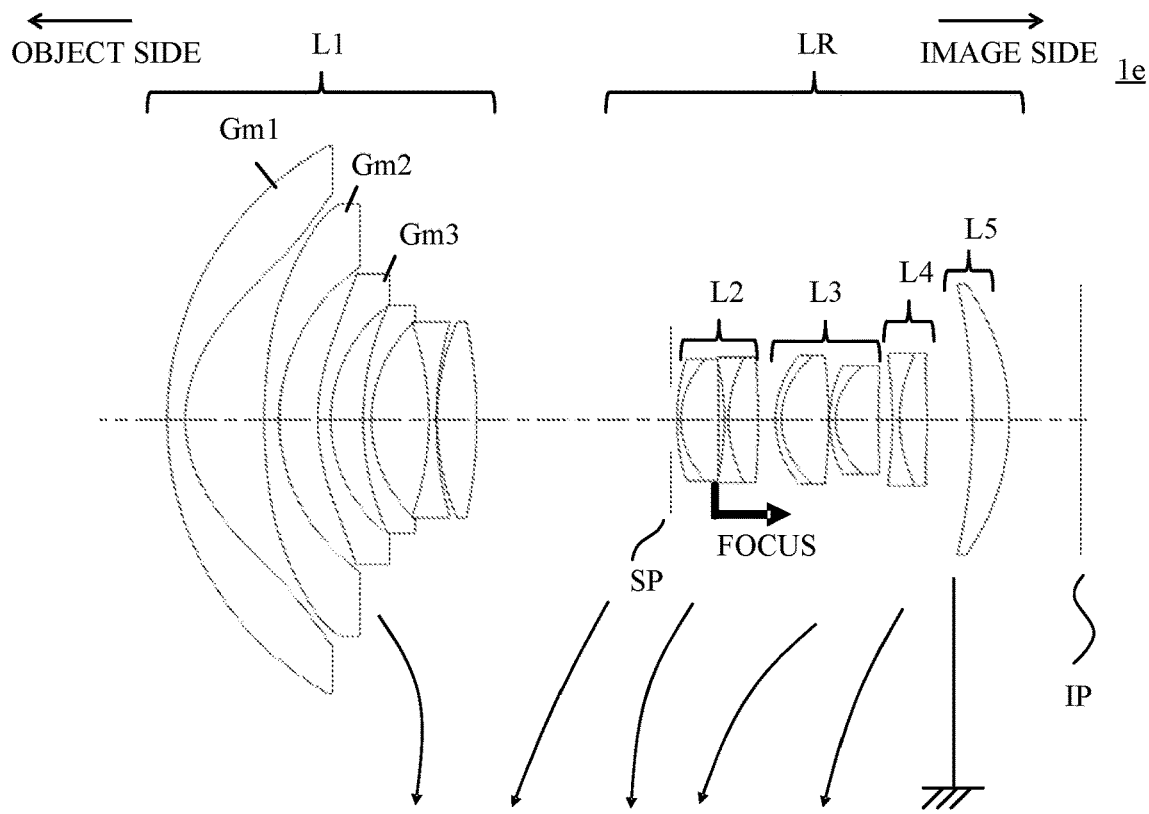
FIG. 9 is a sectional view of a zoom lens according to Example 5 at a wide-angle end.
Figure 10A:
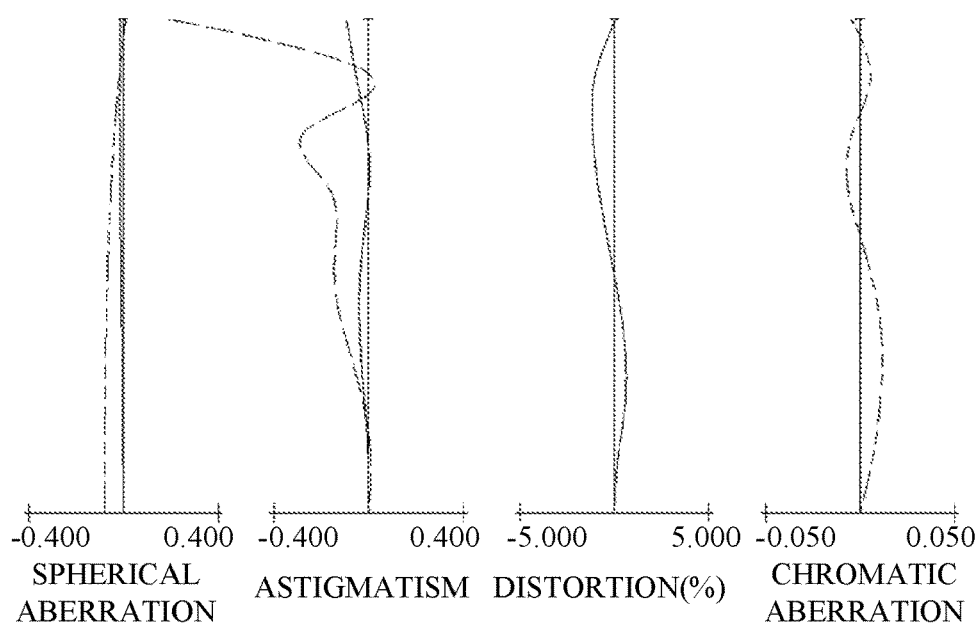
FIGS. 10A to 10C are aberration diagrams of the zoom lens according to Example 5 at the wide-angle end, a middle zoom position, and a telephoto end.
Figure 10B:
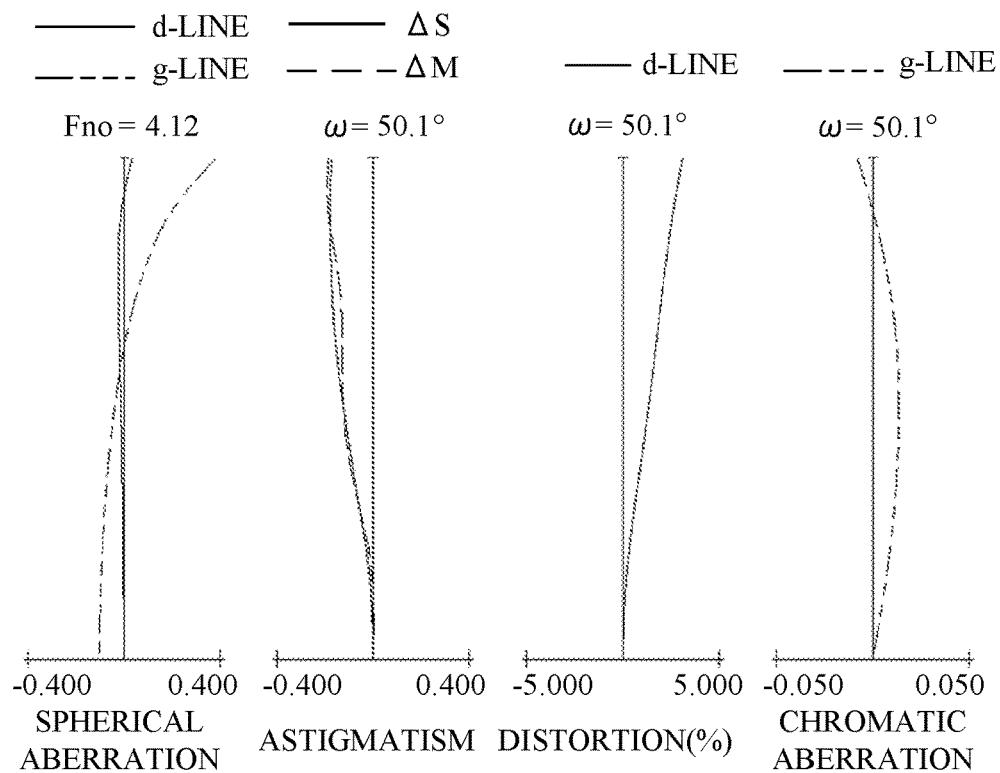
Figure 10C:
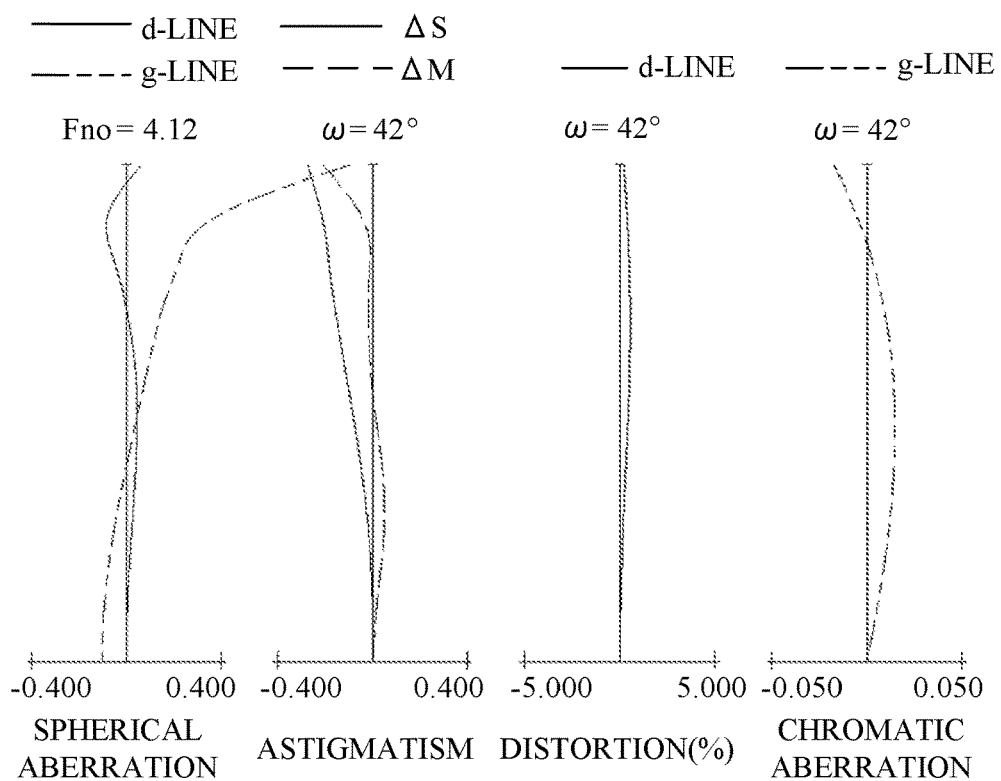

FIG. 9 is a sectional view of the zoom lens 1e according to Example 5 of the present invention which is focused on an object at infinity. FIGS. 10A to 10C are longitudinal aberration diagrams of the zoom lens 1e at a wide-angle end, a middle zoom position, and a telephoto end, respectively. The zoom lens 1e is a zoom lens having a zoom ratio of 2.66 and an F-number of about 4.12. The total angle of view at the wide-angle end of the zoom lens 1e is 135 degrees, and the total angle of view at the telephoto end is 84 degrees.

The zoom lenses 1a to 1e according to each example are zoom lenses used for an image pickup apparatus, such as a digital camera, a video camera, a broadcasting camera, a surveillance cameras, and a film-based camera. The zoom lenses 1a to 1e according to each example can also be used as a projection optical system for a projection apparatus (projector).

In the sectional views of FIGS. 1, 3, 5, 7, and 9, the left side is the object side (front) and the right side is the image side (rear). Where i (=1, 2, . . . ) is the order of the lens units counted from the object side, Li represents the i-th lens unit. LR is a rear unit having one or more lens units and a positive refractive power as a whole (all rear units disposed on the image side of the first lens unit L1). Gmi (i=1, 2, . . . ) is an i-th negative meniscus lens having a convex shape toward the object side counted from the object side.

SP is an aperture stop (a set of stops or diaphragm). IP is an image plane. The image plane IP corresponds to an imaging plane of a solid-state image pickup element (photoelectric conversion element), such as a CCD sensor or a CMOS sensor, when a zoom lens is used for an image pickup apparatus such as a digital camera or a video camera. When a zoom lens is used for an image pickup apparatus of a film-based camera, it corresponds to the film plane. When zooming from the wide-angle end to the telephoto end, each lens unit is moved as indicated by an arrow. The aperture stop SP is moved during zooming as indicated by an arrow. The arrow relating to focusing (FOCUS) indicates a moving direction during focusing from an object at infinity to a short-distance (or near or closest) object.

In the spherical aberration diagrams in FIGS. 2A to 2C, 4A to 4C, 6A to 6C, 8A to 8C, and 10A to 10C, Fno denotes an F-number. A solid line d denotes the d-line (wavelength 587.6 nm), and an alternate long and two short dashes line g denotes the g-line (wavelength 435.8 nm). In the astigmatism diagram, a dotted line ΔM denotes a meridional image plane for the d-line, and a solid line ΔS denotes a sagittal image plane for the d-line. The distortion diagram shows the distortion for the d-line. A lateral chromatic aberration diagram shows the lateral chromatic aberration for the g-line. ω denotes a half angle of view (degree).

Next follows the lens configuration according to each example.

The zoom lens 1a according to Example 1 and the zoom lens 1b according to Example 2 are four-unit zoom lens including, in order from the object side to the image side, the first lens unit L1 to the fourth lens unit L4 having negative, positive, positive, and positive refractive powers. In the zoom lenses 1a and 1b, the aperture stop SP is disposed between the first lens unit L1 and the second lens unit L2.

During zooming from the wide-angle end to the telephoto end, the first lens unit L1 moves toward the image side along a locus having a convex shape to the image side. The aperture stop SP, the second lens unit L2, and the third lens unit L3 move toward the object side along a locus having a convex toward the object side. The aperture stop SP and the second lens unit L2 move so that a distance between them narrows during zooming, and the second lens unit L2 and the third lens unit L3 move so that a distance between them widens during zooming. The fourth lens unit L4, which is the final lens unit, does not move (or is fixed) during zooming. The aperture stop SP and the third lens unit L3 move integrally (with the same locus). The second lens unit L2 moves during focusing.

The zoom lens 1c according to Example 3 is a two-unit zoom lens including, in order from the object side to the image side, the first lens unit L1 having a negative refractive power and the second lens unit L2 (rear unit LR) having a positive refractive power. The aperture stop SP is disposed between the first lens unit L1 and the second lens unit L2.

During zooming from the wide-angle end to the telephoto end, the first lens unit L1 moves toward the image side along a locus having a convex shape to the image side, and the second lens unit L2 moves toward the object side along a locus having a convex shape to the object side so that a distance between the first lens unit L1 and the second lens unit L2 becomes narrower. The aperture stop SP and the second lens unit L2 move toward the object side so that a distance between them becomes wider during zooming. During focusing, the four lenses (two cemented lenses) on the object side of the second lens unit L2 move.

The zoom lens 1d according to Example 4 and the zoom lens 1e according to Example 5 are five-unit zoom lens including, in order from the object side to the image side, the first to fifth lens units L1 to L5 having negative, positive, positive, negative, and positive refractive powers. The aperture stop SP is disposed between the first lens unit L1 and the second lens unit L2.

During zooming from the wide-angle end to the telephoto end, the first lens unit L1 moves toward the image side along a locus having a convex shape to the image side. The aperture stop SP, the second lens unit L2, and the third lens unit L3 move to the object side along a locus having a convex shape to the object side. The aperture stop SP and the second lens unit L2 move so that a distance between them narrows during zooming, and the second lens unit L2 and the third lens unit L3 move so that a distance between them widens during zooming. The fourth lens unit L4 moves to the object side along a locus having a convex shape to the object side. The distance between the third lens unit L3 and the fourth lens unit L4 widens during zooming. The fifth lens unit L5, which is the final lens unit, does not move (or is fixed) during zooming. The aperture stop SP and the third lens unit L3 move integrally (with the same locus). The second lens unit L2 moves during focusing.

Figure 11:
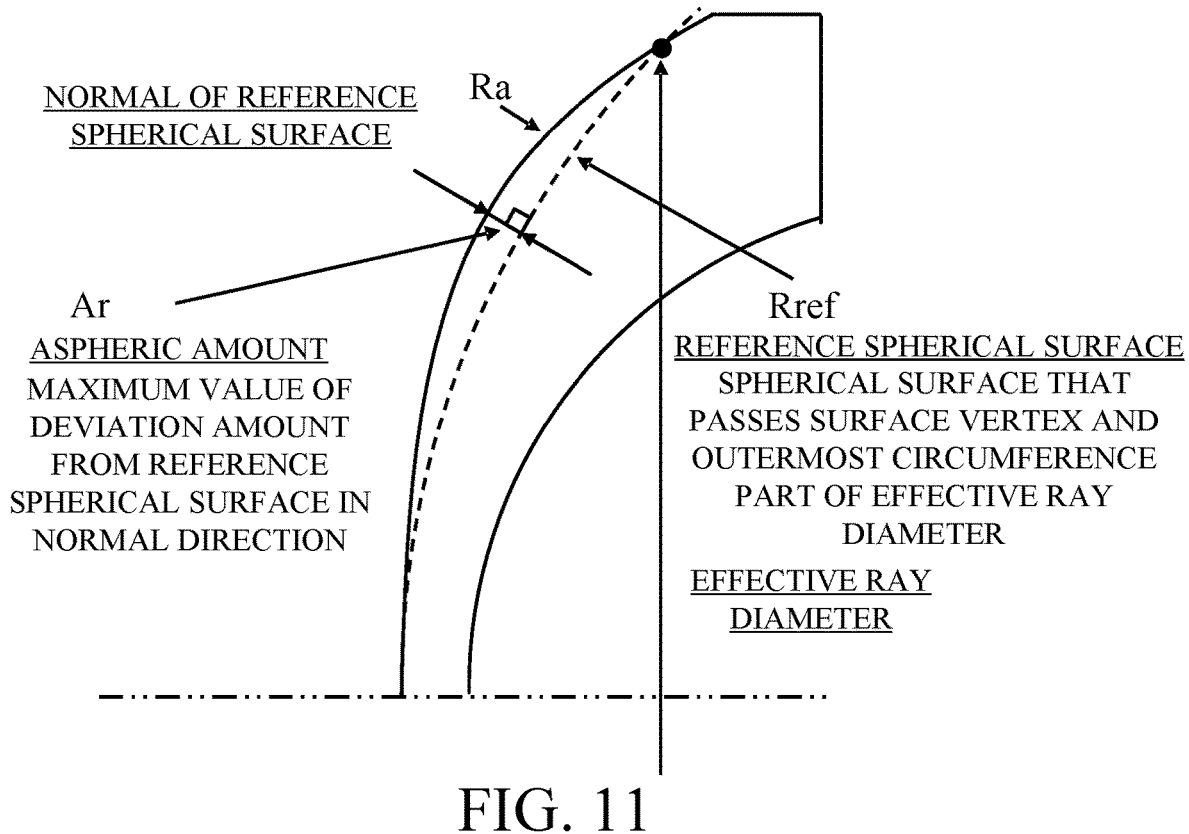
FIG. 11 explains a definition of an aspherical amount according to each example.

Referring now to FIG. 11, a description will be given of a definition of the aspherical amount of the aspherical lens in the zoom lens according to each example. FIG. 11 is an explanatory diagram illustrating the definition of the aspherical amount. As illustrated in FIG. 11, an aspherical amount Ar is defined as the maximum value of the deviation amount of an aspherical surface Ra from a reference spherical surface Rref. The reference spherical surface Rref has a radius (radius of curvature) of the spherical surface determined by the surface vertex and the effective ray diameter of the surface. When the direction in which the aspherical surface Ra deviates from the reference spherical surface Rref is a direction of increasing the medium with respect to the reference spherical surface Rref, the aspherical amount is defined as positive, and when it is a direction of decreasing the medium with respect to the reference spherical surface Rref, the aspherical amount is defined as negative. For example, the aspherical surface Ra illustrated in FIG. 11 has a positive aspherical amount. For an aspherical lens having double-sided aspherical surfaces, the sum of the aspherical amounts of these lens surfaces becomes the aspherical amount of the aspherical lens.

Next follows lens data of well-known literature, a method of determining positive and negative values of the aspheric amount from the actual lens, and a specific method of calculating the aspheric amount. In order to determine the positive/negative value of the aspheric amount and to calculate the aspheric amount, it is necessary to first obtain the radius (radius of curvature) of the reference spherical surface. In order to obtain the radius of the reference spherical surface, it is necessary to obtain the effective ray diameter.

The effective diameter may not be described in the lens data of the literature. In that case, the simplest way to obtain the effective ray diameter is to find the drawing magnification from the actual overall length of the lens drawn in the sectional view of the zoom lens and the known overall lens length shown by numerical data, and to multiply the actual size of the diameter of the drawn curved part by the drawing magnification. Depending on the optical tool, the diameter of the curved part on the drawn lens is set slightly larger than the actual effective ray diameter, but this method is enough to determine the positive/negative value of the aspherical amount and to roughly find the aspherical amount.

In order to obtain the effective ray diameter with higher accuracy, the next calculating method uses the first lens unit L1 having the negative refractive power for part where marginal contact is made or a biconvex lens. In the first lens unit having the negative refractive power in the image pickup lens with a wide angle of view, the entire zoom lens system can be easily made compact and the curvature of field can be easily corrected by narrowing the lens interval between the plurality of negative lenses. Therefore, most of the image pickup lens having a wide angle of view include a pair of lenses that make the marginal contact, in which the lens peripheral parts of the negative lenses contact each other.

Even in the lens periphery of a biconvex lens, the entire system can be easily made compact and the curvature of field can be easily corrected by making the lens peripheral processable thickness as thin as possible. From this fact, ray tracing is performed for all the lens surfaces of the first lens unit L1 by setting the point where the lens surfaces intersect each other to a provisional effective diameter. As a result, the most peripheral light flux is determined with one of the provisional effective diameters, and the height of the light ray at each lens surface becomes the effective ray diameter.

Next follows a method of calculating the effective ray diameter from the actual lens. The simplest way to obtain the effective ray diameter is to measure the diameter of the polished surface of each lens. In many lenses, in order to reduce the weight of the body, the margin amount up to the outermost diameter of the polished surface is made as small as possible relative to the effective diameter. Once the polished surface diameter is measured, the effective ray diameter that is accurate to some extent can be obtained and the accuracy is enough to determine the positive/negative value of the aspherical amount and to roughly find the aspherical amount.

Next, a method of more accurately finding the effective ray diameter is to measure the inner diameter of the light-shielding member that is present in most cases in the first lens unit L1 having the negative refractive power. Usually, when strong light hits the edge of the boundary between the polished surface and the roughly rubbed surface, the light is diffusely reflected at the edge and ghost light is generated. Hence, an unnecessary light cutting method is widely used that disposes the light-shielding member suitable for the effective ray diameter so as to prevent unnecessary light from entering the boundary between the polished surface and the roughly rubbed surface. Ray tracing is made after the light-shielding member is set to a provisional effective diameter.

As a result, the most peripheral light flux is determined at one of the provisional effective diameters, and the height of that ray at each lens surface becomes the effective ray diameter. A method of obtaining an accurate effective ray diameter will be described from another aspect. This method uses a lens system in combination with an image pickup apparatus or a projection apparatus, and inserts a light-shielding member gradually from the lens outer peripheral part to the center on the frontmost surface of the lens system. The position of the light-shielding member just before the shadow is about to appear on the captured or projected image is the effective ray diameter on the frontmost surface of the lens system. Ray tracing started from there can provide the effective ray diameter other than the frontmost surface of the first lens unit L1.

In each example, the first lens unit L1 has at least three meniscus lenses each of which has a convex shape to the object side and a negative refractive power (negative meniscus lenses Gm1, Gm2, and Gm3). Thereby, the negative refractive power of the first lens unit L1 is gained, but the distortion is minimized. At least one surface of at least one of the negative meniscus lenses Gm1 to Gm3 has an aspheric surface having a positive aspheric amount. This aspherical surface corrects a barrel distortion that occurs at the wide-angle end. It is generally effective to correct the distortion by a positive aspherical surface at a position where the off-axis ray is high or a surface close to the object of the first lens unit L1, and each example follows the principle.

The zoom lenses 1a to 1e according to each example are so-called negative lead type zoom lenses. The positive lead type zoom lens is advantageous to a high zoom ratio, but is disadvantageous to a wide angle of view at the wide-angle end beyond 100 degrees.

The zoom lens according to each example satisfies the following conditional expressions (1) and (2):

$$2.85 < D1/skw < 10.00 \tag{1}$$

$$-20.0 < TTDw/f1 < -6.2 \tag{2}$$

Where D1 is a thickness (total thickness) of the first lens unit L1 on the optical axis, skw is a back focus at the wide-angle end or a distance on the optical axis from a surface closest to an image plane of the zoom lens to the image plane at a wide-angle end, TTDw is a distance (overall optical length) from a lens surface (first lens surface) closest to the object of the zoom lens at the wide-angle end to the image plane IP on the optical axis, and f1 is a focal length of the first lens unit L1 is f1.

Here, the thickness D1 of the first lens unit L1 is a distance on the optical axis from a lens surface closes to the object of the first lens unit L1 to a lens surface closest to the image plane of the first lens unit L1. The overall optical length is a length obtained by adding the backfocus value to a distance on the optical axis from the first lens surface to the lens surface closest to the image plane (final lens surface). The backfocus skw is a distance (air converted length) from the final lens surface to the image plane IP on the optical axis.

In this example, assume that fw is a focal length of the zoom lens at the wide-angle end, fwr is a combined focal length at the wide-angle end of the lens unit disposed on the image side of the first lens unit L1 (the focal length of the rear lens unit LR at the wide-angle end), frp is a focal length of the lens unit having a positive refractive power, which is disposed closest to the object in the rear unit LR. In addition, POw is a distance from the image plane IP to the exit pupil at the wide-angle end, and fg1 is a focal length of the lens closes to the object (first lens such as the negative meniscus lens Gm1) in the zoom lens. Of the three negative meniscus lenses Gm1 to Gm3 that have a convex shape to the object side in the first lens unit L1, Aspi (i=1, 2, 3) is an aspherical amount of an i-th negative meniscus lens counted from the object side, and Ndi (i=1, 2, 3) is a refractive index.

At this time, the zoom lens according to each example may satisfy at least one of the following conditional expressions (3) to (7).

$$-4.0 < f1/fw < -1.0 \quad (3)$$

$$1.5 < frw/fw < 6.0 \quad (4)$$

$$1.5 < frp/fw < 20.0 \quad (5)$$

$$2.0 < POw/fw < 15.0 \quad (6)$$

$$1.3 < fg1/f1 < 6.0 \quad (7)$$

$$0.01 < (\Sigma Aspi \times Ndi)/D1 < 0.50 \quad (8)$$

The position of the exit pupil is measured from the image plane IP. The distance of the position of the exit pupil has a negative sign when it is located on the object side of the image plane IP and a positive sign when it is located on the image side. The aspherical amount Aspi of the aspherical surface of the i-th negative meniscus lens is a sum of the object-side and image-side aspherical amounts of the i-th meniscus lens. $\Sigma$ represents a sum of values of the respective parameters from the first negative meniscus lens to the third negative meniscus lens.

Next follows a description of the technical meaning of each conditional expression described above.

The conditional expression (1) defines a relationship between the thickness D1 of the first lens unit L1 and the backfocus skw in order to satisfactorily correct the distortion at the wide-angle end while reducing the overall lens length. When the thickness D1 of the first lens unit L1 is increased beyond the upper limit of the conditional expression (1), many negative meniscus lenses can be disposed to correct the distortion. This configuration is advantageous to the optical performance, but leads to an increased overall lens length. Since the first lens unit L1 becomes thick, the distance from the first lens unit L1 to the entrance pupil position becomes longer, and the front lens diameter becomes larger. When the backfocus skw becomes smaller, it becomes difficult to mechanically layout the connector between the zoom lens (imaging optical system) and the camera body. On the other hand, when the thickness D1 of the first lens unit L1 becomes smaller beyond the lower limit of the conditional expression (1), it is advantageous to reduce the overall lens length, but it becomes difficult to correct the distortion while maintaining a wide field of view. If a wide field of view is ensured while the thickness of the first lens unit L1 is kept small, it is necessary to increase each refractive power of the first lens unit L1 and thus the image surface distortion and the lateral chromatic aberration are deteriorated. If the backfocus skw becomes larger, a space for the backfocus is unnecessarily secured, which is not preferable from the viewpoint of making smaller the overall lens length.

The conditional expression (2) defines a relationship between the overall optical length TTDw at the wide-angle end and the focal length f1 of the first lens unit L1 in order to reduce the overall lens length. When the value is lower than the lower limit of the conditional expression (2) and the overall lens length TTDw at the wide-angle end becomes larger, the overall lens length cannot be made smaller. Alternatively, when the focal length f1 of the first lens unit L1 becomes small, the negative refractive power of the entire zoom lens system becomes too strong, and it becomes difficult to control the Petzval sum. As a result, the desired optical performance, particularly the curvature of field and the astigmatism at the wide-angle end, undesirably deteriorates. On the other hand, the overall lens length at the wide-angle end shorter beyond the upper limit of the conditional expression (2) is preferable from the viewpoint of shortening the overall lens length, but it is necessary to extremely strengthen the positive refractive power of the rear lens unit LR. As a result, it becomes difficult to suppress the aspherical aberration, the longitudinal chromatic aberration, etc. Alternatively, if the focal length of the first lens unit L1 becomes long, it becomes difficult to obtain a desired wide angle of view.

The conditional expression (3) defines a relationship between the focal length f1 of the first lens unit L1 and the focal length fw of the zoom lens at the wide-angle end in order to define a proper refractive power of the first lens unit L1 for a wider angle of view. When the focal length f1 of the first lens unit L1 becomes smaller beyond the upper limit of the conditional expression (3), the Petzval sum of the entire zoom lens system becomes too large in the negative direction, and the field curvature and astigmatism deteriorate. In order to correct the lateral chromatic aberration at the wide-angle end, it is necessary to increase the number of positive lenses in the first lens unit L1, the thickness of the first lens unit L1 becomes too large to reduce the overall lens length and lens diameter. Alternatively, the focal length fw at the wide-angle end becomes too large, and the wide angle of view cannot be realized. On the other hand, the increased focal length f1 of the first lens unit L1 beyond the lower limit of the conditional expression (3) is advantageous to the aberrational correction such as the distortion and field curvature, but it becomes difficult to realize a wide angle of view. Alternatively, the focal length fw at the wide-angle end becomes too short, which may realize the wider angle of view, but it becomes difficult to maintain the optical performance such as the distortion.

The conditional expression (4) is a combined focal length frw at the wide-angle end of the rear unit LR, which includes all lens units on the image side of the first lens unit L1, and a focal length fw at the wide-angle end, in order to reduce the overall lens length. When the focal length frw of the rear lens unit LR becomes larger beyond the upper limit of the conditional expression (4), the effect of converging the light flux diverged by the first lens unit L1 becomes smaller, and as a result, the backfocus becomes longer and the overall lens length cannot be smaller. Alternatively, the focal length fw at the wide-angle end becomes too small, and a wide angle of view can be realized, but it becomes difficult to maintain a good optical performance such as reducing the distortion. On the other hand, when the combined focal length frw of the rear lens unit LR becomes smaller beyond the lower limit of the conditional expression (4), the retrofocus arrangement is enhanced. This configuration is advantageous to a shortened overall lens length, but the positive refractive power of the rear lens unit LR becomes too strong. Hence, it becomes difficult to control the optical performance in the entire zoom range, particularly the zoom fluctuation of the field curvature. It may also be difficult to secure a sufficient backfocus. Alternatively, the focal length fw at the wide-angle end becomes too large, and the wide angle of view cannot be realized.

The conditional expression (5) defines a relationship between a focal length frp of the lens unit having the positive refractive power disposed closest to the object in the zoom lens and the focal length fw at the wide-angle end, in order to set a proper ray emission angle at the wide-angle end. When the focal length frp of the positive lens unit closest to the object becomes large beyond the upper limit of the conditional expression (5), the incident angle of the peripheral light flux incident on the image sensor or the like disposed on the image plane IP is likely to be too large for so-called shading. Alternatively, the focal length fw at the wide-angle end becomes large, and the desired wide angle of view cannot be realized. On the other hand, a smaller focal length frp of the positive lens unit closest to the object beyond the lower limit of the conditional expression (5) is preferable from the viewpoint of shading, but the negative field curvature at the wide angle end is deteriorated. Alternatively, the focal length fw at the wide-angle end becomes too small, a wide angle of view can be realized but it becomes difficult to maintain a good optical performance such as reducing the distortion.

The conditional expression (6) defines a relationship between the exit pupil position POw at the wide-angle end and the focal length fw of the entire zoom lens system at the wide-angle end, in order to ensure a high telecentricity. If the exit pupil POw becomes larger beyond the lower limit of the conditional expression (6), the refractive power of the final lens unit is likely to increase and it becomes difficult to sufficiently suppress the field curvature. On the other hand, when the exit pupil POw becomes smaller beyond the upper limit of the conditional expression (6), an incident angle on the image plane of a ray having the peripheral image height becomes too large for shading. Alternatively, the focal length fw at the wide-angle end becomes large, and it becomes difficult to achieve a desired wide angle of view.

The conditional expression (7) defines a relationship between a focal length fg1 of the lens (first lens) closest to the object and the focal length f1 of the first lens unit L1, in order to reduce the front lens diameter. When the focal length fg1 becomes larger beyond the upper limit of the conditional expression (7), the principal point position of the first lens unit moves to the object side, weakening the retrofocus arrangement and increasing the overall lens length at the wide-angle end. Alternatively, since the negative focal length f1 of the first lens unit L1 becomes small and the refractive power of the first lens unit L1 becomes too strong, the negative Petzval sum of the entire zoom lens system becomes large. As a result, the field curvature, the astigmatism, and finally the optical performance are deteriorated. On the other hand, when the focal length f1g of the first lens becomes smaller beyond the lower limit of the conditional expression (7), the refractive power of the first lens becomes stronger and the distortion amount becomes larger, so that it is necessary to increase the positive aspherical amount of each negative meniscus lens so as to correct it. Hence, the lens thickness is likely to become too large for the shortened overall lens length and the lens diameter. Alternatively, if the focal length f1 of the first lens unit L1 becomes larger, it becomes difficult to achieve a desired wide angle of view.

The conditional expression (8) is a conditional expression for effectively correcting the distortion generated in the first lens unit L1. The conditional expression (8) defines a relationship among the aspherical amount Aspi and the refractive index Ndi of each of the negative meniscus lenses Gm1 to Gm3 having a convex shape to the third object side counted from the object side in the first lens unit L1, and the thickness D1. When the positive aspherical amount Aspi becomes larger beyond the upper limit of the conditional expression (8), the distortion at the wide-angle end becomes overcorrected, and when the height of the off-axis light flux changes due to zooming, the fluctuation of the aspherical effect becomes too large and the optical performance in the entire zoom range deteriorates. On the other hand, when the positive aspherical amount Aspi becomes smaller beyond the lower limit of the conditional expression (8), the distortion correction becomes insufficient.

In each example, the numerical ranges of conditional expressions (1) to (8) may be set as in the following conditional expressions (1a) to (8a).

$$2.95<D1/skw<7.00 \tag{1a}$$

$$-12.0<TTDw/f1<-6.8 \tag{2a}$$

$$-3.0<f1/fw<-1.4 \tag{3a}$$

$$2.0<frw/fw<5.0 \tag{4a}$$

$$2.0<frp/fw<15.0 \tag{5a}$$

$$3.0<POw/fw<10.0 \tag{6a}$$

$$2.0<fg1/f1<5.0 \tag{7a}$$

$$0.05<(\Sigma Aspi \times Ndi)/D1<0.25 \tag{8a}$$

In each example, the numerical ranges of the conditional expressions (1) to (8) may be set as in the following conditional expressions (1b) to (8b), respectively.

$$3.10<D1/skw<5.00 \tag{1b}$$

$$-9.0<TTDw/f1<-6.9 \tag{2b}$$

$$-2.0<f1/fw<-1.6 \tag{3b}$$

$$2.4<frw/fw<4.0 \tag{4b}$$

$$2.5<frp/fw<11.0 \tag{5b}$$

$$4.0 < POw/fw < 8.5 \quad (6b)$$

$$2.9 < fg1/f1 < 4.0 \quad (7b)$$

$$0.07 < (\Sigma Aspi \times Ndi)/D1 < 0.15 \quad (8b)$$

The zoom lens according to each example may be configured such that the second lens unit L2 moves during focusing. Focusing with the second lens unit L2 in which the incident angle and the exit angle of the off-axis light flux are relatively small can suppress the focusing fluctuation in the entire zoom range, such as the field curvature.

Each example may employ a positive aspherical surface for the first lens in order to effectively correct the distortion at the wide-angle end. In order to correct the distortion and to reduce the lens diameter, the image side of the first lens may have an aspherical surface with a positive aspherical amount. In each example, in order to suppress the distortion and to suppress the thickness of the first lens unit L1, three negative meniscus lenses may be sequentially disposed from the object side to the image side. In order to correct both the distortion and the field curvature at the wide-angle end, the first lens unit L1 may include four or more lenses having negative refractive powers. Each example can provide a compact zoom lens having a wide angle of view and a high optical performance over the zoom range.

Numerical examples corresponding to Examples 1 to 5 will be described below. In the surface data according to each numerical example, r represents a radius of curvature of each optical surface, and d (mm) represents an axial distance (distance on the optical axis) between an m-th surface and an (m+1)-th surface. However, m is the number of the surface counted from the light incident side. nd represents a refractive index of each optical element for the d-line, and vd represents an Abbe number of the optical element. The Abbe number vd of a certain material is expressed as follows where Nd, NF, and NC are refractive indexes for the d-line (587.6 nm), the F-line (486.1 nm), and the C-line (656.3 nm) in the Fraunhofer line:

$$vd = (Nd-1)/(NF-NC)$$

In each numerical example, values of d, a focal length (mm), an F-number, and half an angle of view (°) are those when the zoom lens according to each example is focused on an object at infinity. "BF" (backfocus) is a distance on the optical axis from the final lens surface (lens surface closest to the image plane) to the paraxial image plane, which is expressed by an air converted length. The "overall lens length" is a length obtained by adding the backfocus to a distance on the optical axis from the frontmost surface (lens surface closest to the object) to the final surface of the zoom lens. The "lens unit" is not limited to a plurality of lenses, but may consist of a single lens. The aspherical shape is expressed as follows:

$$X = \frac{H^2/R}{1+\sqrt{1-(1+K)(H/R)^2}} + A4H^4 + A6H^6 + A8H^8 + A10H^{10}$$

where an X axis is set to the optical axis direction, an H axis is set to a direction orthogonal to the optical axis, a light traveling direction is set to be positive, R is a paraxial radius of curvature, K is a conic constant, and A4, A6, A8, and A10 are aspherical coefficients.

* means a surface having an aspherical shape. "e-x" means $10^{-x}$. BF is an air converted backfocus. The overall lens length is a value obtained by adding the value of the backfocus BF to a distance from the first lens surface to the final lens surface. Table 1 shows a relationship between the above conditional expressions and each example. Table 2 shows a relationship between the aspherical amount of the aspherical lens and the conditional expression in each example.

Numerical Example 1

| | | UNIT mm Surface data | | | |
|---|---|---|---|---|---|
| surface number | r | d | nd | vd | effective diameter |
| 1 | 44.458 | 2.90 | 1.80400 | 46.6 | 75.00 |
| 2* | 21.248 | 9.83 | | | 63.13 |
| 3 | 38.785 | 2.30 | 1.49700 | 81.5 | 54.65 |
| 4 | 26.035 | 6.13 | | | 42.69 |
| 5* | 31.722 | 2.10 | 2.00069 | 25.5 | 40.87 |
| 6 | 18.751 | 6.88 | | | 30.75 |
| 7 | 67.844 | 1.30 | 2.05090 | 26.9 | 29.96 |
| 8 | 21.412 | 7.04 | | | 26.28 |
| 9 | −40.538 | 1.15 | 1.59522 | 67.7 | 26.17 |
| 10 | 113.373 | 0.15 | | | 26.47 |
| 11 | 41.751 | 5.82 | 1.85478 | 24.8 | 26.89 |
| 12 | −54.444 | (variable) | | | 26.55 |
| 13 (stop) | ∞ | (variable) | | | 14.30 |
| 14 | 29.425 | 0.65 | 1.95906 | 17.5 | 14.89 |
| 15 | 12.383 | 5.58 | 1.85025 | 30.1 | 14.63 |
| 16 | −479.967 | 0.63 | | | 14.48 |
| 17 | −43.276 | 0.65 | 1.88300 | 40.8 | 14.47 |
| 18 | 15.694 | 4.25 | 1.92286 | 20.9 | 14.77 |
| 19 | −144.898 | (variable) | | | 14.94 |
| 20 | 15.094 | 0.95 | 2.05090 | 26.9 | 15.58 |
| 21 | 11.832 | 6.44 | 1.49700 | 81.5 | 15.14 |
| 22 | −58.021 | 0.15 | | | 15.78 |
| 23 | 17.203 | 0.95 | 2.05090 | 26.9 | 16.24 |
| 24 | 9.945 | 8.78 | 1.49700 | 81.5 | 15.15 |
| 25 | −41.419 | 0.77 | | | 16.03 |
| 26 | −22.608 | 1.39 | 1.90043 | 37.4 | 16.04 |
| 27 | 18.717 | 8.38 | 1.49700 | 81.5 | 18.15 |

-continued

| | | | | | |
|---|---|---|---|---|---|
| 28* | −31.438 | (variable) | | | 22.59 |
| 29 | −53.451 | 4.29 | 1.80400 | 46.6 | 35.32 |
| 30 | −31.058 | (variable) | | | 36.44 |
| image plane | ∞ | | | | |

ASPHERIC DATA second surface
 $K = -6.42079e-001$  $A4 = -1.67651e-006$  $A6 = -1.30501e-008$  $A8 = 4.21956e-011$
 $A10 = -1.01055e-013$  $A12 = 9.31274e-017$  $A14 = -3.11450e-020$
fifth surface
 $K = 0.00000e+000$  $A4 = -1.26600e-005$  $A6 = 1.72150e-008$  $A8 = -1.25479e-010$
 $A10 = 3.20866e-013$  $A12 = -3.46049e-016$  $A14 = 1.22670e-019$
twenty-eighth surface
 $K = 0.00000e+000$  $A4 = 3.41130e-005$  $A6 = 2.90832e-008$  $A8 = 6.35358e-010$
 $A10 = -1.40125e-011$  $A12 = 7.64931e-014$  $A14 = -1.99974e-016$

VARIOUS DATA

| Zoom ratio | 1.88 | | |
|---|---|---|---|
| | Wide-angle | Middle | Telephoto |
| Focal length | 9.27 | 15.01 | 17.46 |
| F-number | 4.12 | 4.12 | 4.12 |
| Half angle of view | 66.80 | 55.25 | 51.10 |
| Image height | 21.64 | 21.64 | 21.64 |
| overall lens length | 137.08 | 131.94 | 133.25 |
| BF | 13.49 | 13.49 | 13.49 |
| d12 | 26.03 | 9.30 | 5.63 |
| d13 | 1.74 | 1.50 | 1.29 |
| d19 | 2.57 | 2.81 | 3.02 |
| d28 | 3.78 | 15.38 | 20.36 |
| d30 | 13.49 | 13.49 | 13.49 |
| entrance pupil position | 23.74 | 22.69 | 22.37 |
| exit pupil position | −56.16 | −99.61 | −127.53 |
| front principal position | 31.78 | 35.71 | 37.67 |
| rear principal position | 4.22 | −1.51 | −3.97 |

ZOOM LENS UNIT DATA

| Unit | Starting Surface | Focal length | overall lens length | front principal position | rear principal position |
|---|---|---|---|---|---|
| 1 | 1 | −16.28 | 45.59 | 11.05 | −31.60 |
| Stop | 13 | ∞ | 0.00 | 0.00 | −0.00 |
| 2 | 14 | 66.60 | 11.77 | −1.63 | −8.15 |
| 3 | 20 | 51.94 | 27.81 | −12.24 | −27.25 |
| 4 | 29 | 84.95 | 4.29 | 5.23 | 3.04 |

Single lens data

| Lens | Starting surface | Focal length |
|---|---|---|
| 1 | 1 | −53.61 |
| 2 | 3 | −169.51 |
| 3 | 5 | −49.87 |
| 4 | 7 | −30.20 |
| 5 | 9 | −50.03 |
| 6 | 11 | 28.44 |
| 7 | 14 | −22.72 |
| 8 | 15 | 14.27 |
| 9 | 17 | −12.98 |
| 10 | 18 | 15.54 |
| 11 | 20 | −61.22 |
| 12 | 21 | 20.40 |
| 13 | 23 | −24.05 |
| 14 | 24 | 17.11 |
| 15 | 26 | −11.19 |
| 16 | 27 | 24.99 |
| 17 | 29 | 84.95 |

Numerical Example 2

UNIT mm
Surface data

| surface number | r | d | nd | vd | effective diameter |
|---|---|---|---|---|---|
| 1* | 54.891 | 2.90 | 1.77250 | 49.6 | 78.00 |
| 2* | 21.099 | 11.54 | | | 63.08 |
| 3 | 47.796 | 2.30 | 1.43875 | 94.7 | 59.67 |
| 4 | 25.806 | 5.18 | | | 42.35 |
| 5* | 27.639 | 2.10 | 2.00069 | 25.5 | 40.71 |
| 6 | 19.073 | 7.22 | | | 31.28 |
| 7 | 78.241 | 1.30 | 2.05090 | 26.9 | 30.32 |
| 8 | 21.050 | 6.98 | | | 26.19 |
| 9 | −42.212 | 1.15 | 1.59522 | 67.7 | 26.06 |
| 10 | 97.173 | 0.15 | | | 26.14 |
| 11 | 40.667 | 6.91 | 1.85478 | 24.8 | 26.43 |
| 12 | −56.230 | (variable) | | | 25.75 |
| 13 (stop) | ∞ | (variable) | | | 13.40 |
| 14 | 28.464 | 0.65 | 1.95906 | 17.5 | 13.96 |
| 15 | 11.436 | 4.80 | 1.85025 | 30.1 | 13.72 |
| 16 | −350.486 | 0.62 | | | 13.62 |
| 17 | −37.382 | 0.65 | 1.88300 | 40.8 | 13.62 |
| 18 | 14.136 | 4.39 | 1.92286 | 20.9 | 13.98 |
| 19 | −134.377 | (variable) | | | 14.20 |
| 20 | 13.687 | 0.95 | 2.05090 | 26.9 | 14.57 |
| 21 | 10.662 | 6.39 | 1.49700 | 81.5 | 13.77 |
| 22 | −51.948 | 0.15 | | | 14.59 |
| 23 | 16.159 | 0.95 | 2.05090 | 26.9 | 15.16 |
| 24 | 9.292 | 9.56 | 1.49700 | 81.5 | 14.17 |
| 25 | −36.546 | 0.92 | | | 15.53 |
| 26 | −19.039 | 1.20 | 1.90043 | 37.4 | 15.55 |
| 27 | 20.738 | 7.01 | 1.49700 | 81.5 | 17.99 |
| 28* | −30.499 | (variable) | | | 21.98 |
| 29 | −85.830 | 5.19 | 1.80400 | 46.6 | 36.77 |
| 30 | −34.699 | (variable) | | | 37.92 |
| image plane | ∞ | | | | |

ASPHERIC DATA first surface
K = 0.00000e+000   A4 = 3.53571e−006   A 6 = −5.06204e−009   A 8 = 4.88628e−012
A10 = −1.85300e−015   A12 = 2.73266e−020   A14 = 2.02336e−022
second surface
K = −6.70065e−001   A 4 = 5.33306e−007   A 6 = −7.83132e−009   A 8 = 3.85625e−013
A10 = −7.53499e−015   A12 = 8.79029e−018   A14 = −3.67394e−021
fifth surface
K = 0.00000e+000   A 4 = −1.36163e−005   A 6 = 8.77109e−009   A 8 = −1.12972e−010
A10 = 2.77577e−013   A12 = −2.79925e−016   A14 = 7.55759e−020
twenty-eighth surface
K = 0.00000e+000   A 4 = 4.97175e−005   A 6 = 9.95061e−008   A 8 = 6.20192e−010
A10 = −2.21474e−011   A12 = 1.43368e−013   A14 = −3.74149e−016

VARIOUS DATA

| Zoom ratio | 2.00 | | |
|---|---|---|---|
| | Wide-angle | Middle | Telephoto |
| Focal length | 8.00 | 14.67 | 16.00 |
| F-number | 4.12 | 4.12 | 4.12 |
| Half angle of view | 69.70 | 55.87 | 53.52 |
| Image height | 21.64 | 21.64 | 21.64 |
| overall lens length | 132.89 | 126.29 | 127.00 |
| BF | 10.00 | 10.00 | 10.00 |
| d12 | 24.41 | 4.57 | 2.62 |
| d13 | 1.52 | 1.34 | 1.27 |
| d19 | 2.31 | 2.48 | 2.55 |
| d28 | 3.49 | 16.74 | 19.40 |
| d30 | 10.00 | 10.00 | 10.00 |
| entrance pupil position | 22.60 | 21.42 | 21.25 |
| exit pupil position | −54.70 | −121.62 | −144.66 |
| front principal position | 29.61 | 34.45 | 35.60 |
| rear principal position | 1.99 | −4.67 | −6.00 |

-continued

ZOOM LENS UNIT DATA

| Unit | Starting Surface | Focal length | overall lens length | front principal position | rear principal position |
|---|---|---|---|---|---|
| 1 | 1 | −15.09 | 47.73 | 10.65 | −33.01 |
| stop | 13 | ∞ | 0.00 | 0.00 | −0.00 |
| 2 | 14 | 72.87 | 11.11 | −1.83 | −7.99 |
| 3 | 20 | 43.13 | 27.13 | −13.22 | −26.04 |
| 4 | 29 | 69.31 | 5.19 | 4.62 | 1.87 |

Single lens data

| Lens | Starting surface | Focal length |
|---|---|---|
| 1 | 1 | −46.09 |
| 2 | 3 | −132.05 |
| 3 | 5 | −70.09 |
| 4 | 7 | −27.73 |
| 5 | 9 | −49.29 |
| 6 | 11 | 28.55 |
| 7 | 14 | −20.31 |
| 8 | 15 | 13.10 |
| 9 | 17 | −11.55 |
| 10 | 18 | 14.06 |
| 11 | 20 | −54.72 |
| 12 | 21 | 18.42 |
| 13 | 23 | −22.40 |
| 14 | 24 | 16.02 |
| 15 | 26 | −10.87 |
| 16 | 27 | 26.02 |
| 17 | 29 | 69.31 |

Numerical Example 3

UNIT mm
Surface data

| surface number | r | d | nd | vd | effective diameter |
|---|---|---|---|---|---|
| 1 | 48.757 | 2.90 | 1.80400 | 46.6 | 74.24 |
| 2* | 21.728 | 9.56 | | | 61.52 |
| 3 | 58.586 | 2.30 | 1.49700 | 81.5 | 61.01 |
| 4 | 26.194 | 8.01 | | | 42.44 |
| 5* | 43.199 | 2.10 | 2.00069 | 25.5 | 40.24 |
| 6 | 20.025 | 6.81 | | | 31.18 |
| 7 | 101.582 | 1.30 | 2.05090 | 26.9 | 30.81 |
| 8 | 50.077 | 4.36 | | | 29.65 |
| 9 | −62.903 | 1.15 | 1.59522 | 67.7 | 29.53 |
| 10 | 78.309 | 0.15 | | | 29.37 |
| 11 | 41.742 | 6.07 | 1.85478 | 24.8 | 29.63 |
| 12 | −76.743 | (variable) | | | 29.13 |
| 13 (stop) | ∞ | (variable) | | | 12.12 |
| 14 | 32.120 | 0.65 | 1.95906 | 17.5 | 13.05 |
| 15 | 11.507 | 4.35 | 1.85025 | 30.1 | 12.87 |
| 16 | −521.297 | 0.72 | | | 12.83 |
| 17 | −31.863 | 0.65 | 1.88300 | 40.8 | 12.82 |
| 18 | 16.110 | 5.30 | 1.92286 | 20.9 | 13.27 |
| 19 | −56.286 | 2.65 | | | 13.75 |
| 20 | 15.555 | 0.95 | 2.05090 | 26.9 | 16.02 |
| 21 | 12.417 | 7.40 | 1.49700 | 81.5 | 15.58 |
| 22 | −68.881 | 0.15 | | | 16.34 |
| 23 | 18.720 | 0.95 | 2.05090 | 26.9 | 16.74 |
| 24 | 10.177 | 11.14 | 1.49700 | 81.5 | 15.62 |
| 25 | −23.164 | 0.98 | | | 17.18 |
| 26 | −20.472 | 1.20 | 1.90043 | 37.4 | 17.18 |
| 27 | 20.450 | 7.71 | 1.49700 | 81.5 | 19.59 |
| 28* | −51.355 | 0.77 | | | 24.06 |

-continued

| | | | | | |
|---|---|---|---|---|---|
| 29 | 66.644 | 2.30 | 1.89286 | 20.4 | 29.12 |
| 30 | 186.394 (variable) | | | | 29.63 |
| image plane | ∞ | | | | |

ASPHERIC DATA second surface
K = −6.31584e−001  A 4 = −1.31185e−006  A 6 = −1.75654e−008  A 8 = 4.57968e−011
A10 = −1.01078e−013  A12 = 9.23023e−017  A14 = −3.08376e−020
fifth surface
K = 0.00000e+000  A 4 = −1.10225e−005  A 6 = 1.66949e−008  A 8 = −1.14210e−010
A10 = 3.21300e−013  A12 = −4.00887e−016  A14 = 1.82668e−019
twenty-eighth surface
K = 0.00000e+000  A4 = 2.88197e−005  A 6 = 7.61765e−008  A 8 = −5.11020e−010
A10 = −3.27489e−012  A12 = 3.11603e−014  A14 = −1.19975e−016

VARIOUS DATA

| Zoom ratio | 1.75 | | |
|---|---|---|---|
| | Wide-angle | Middle | Telephoto |
| Focal length | 10.00 | 15.00 | 17.46 |
| F-number | 4.12 | 4.12 | 4.12 |
| Half angle of view | 65.19 | 55.27 | 51.10 |
| Image height | 21.64 | 21.64 | 21.64 |
| overall lens length | 135.49 | 124.63 | 123.10 |
| BF | 14.19 | 21.45 | 25.02 |
| d12 | 28.13 | 5.98 | 1.95 |
| d13 | 0.60 | 4.64 | 3.56 |
| d30 | 14.19 | 21.45 | 25.02 |
| entrance pupil position | 23.29 | 21.52 | 21.05 |
| exit pupil position | −30.47 | −35.98 | −34.32 |
| front principal position | 31.05 | 32.60 | 33.37 |
| rear principal position | 4.19 | 6.45 | 7.56 |

ZOOM LENS UNIT DATA

| Unit | Starting Surface | Focal length | overall lens length | front principal position | rear principal position |
|---|---|---|---|---|---|
| 1 | 1 | −19.35 | 44.69 | 8.59 | −33.03 |
| stop | 13 | ∞ | 0.00 | 0.00 | −0.00 |
| 3 | 14 | 28.09 | 47.87 | 1.33 | −28.41 |

Single lens data

| Lens | Starting surface | Focal | length |
|---|---|---|---|
| 1 | 1 | −51.20 | |
| 2 | 3 | −97.63 | |
| 3 | 5 | −39.07 | |
| 4 | 7 | −95.21 | |
| 5 | 9 | −58.43 | |
| 6 | 11 | 32.39 | |
| 7 | 14 | −18.99 | |
| 8 | 15 | 13.29 | |
| 9 | 17 | −12.04 | |
| 10 | 18 | 14.07 | |
| 11 | 20 | −69.33 | |
| 12 | 21 | 21.83 | |
| 13 | 23 | −22.50 | |
| 14 | 24 | 16.00 | |
| 15 | 26 | −11.21 | |
| 16 | 27 | 30.52 | |
| 17 | 29 | 115.14 | |

Numerical Example 4

UNIT mm
Surface data

| surface number | r | d | nd | vd | effective diameter |
|---|---|---|---|---|---|
| 1 | 46.195 | 2.90 | 1.80400 | 46.6 | 75.00 |
| 2* | 20.910 | 9.99 | | | 62.20 |
| 3 | 45.691 | 2.30 | 1.49700 | 81.5 | 57.13 |
| 4 | 25.472 | 7.15 | | | 41.83 |
| 5* | 35.102 | 2.10 | 2.00069 | 25.5 | 39.74 |
| 6 | 18.117 | 7.58 | | | 29.77 |
| 7 | 123.627 | 1.30 | 2.05090 | 26.9 | 29.16 |
| 8 | 37.943 | 4.91 | | | 27.48 |
| 9 | −48.272 | 1.15 | 1.59522 | 67.7 | 27.36 |
| 10 | 73.233 | 0.15 | | | 27.43 |
| 11 | 43.010 | 7.09 | 1.85478 | 24.8 | 27.73 |
| 12 | −57.937 | (variable) | | | 27.17 |
| 13(stop) | ∞ | (variable) | | | 14.07 |
| 14 | 29.794 | 0.65 | 1.95906 | 17.5 | 14.65 |
| 15 | 12.196 | 5.09 | 1.85025 | 30.1 | 14.40 |
| 16 | −105.431 | 0.33 | | | 14.30 |
| 17 | −47.199 | 0.65 | 1.88300 | 40.8 | 14.30 |
| 18 | 13.556 | 4.24 | 1.92286 | 20.9 | 14.44 |
| 19 | 329.999 | (variable) | | | 14.47 |
| 20 | 14.025 | 0.95 | 2.05090 | 26.9 | 15.07 |
| 21 | 11.028 | 6.23 | 1.49700 | 81.5 | 14.58 |
| 22 | −98.460 | 0.15 | | | 15.19 |
| 23 | 19.288 | 0.95 | 2.05090 | 26.9 | 15.64 |
| 24 | 10.122 | 7.73 | 1.49700 | 81.5 | 14.77 |
| 25 | −217.247 | (variable) | | | 16.11 |
| 26 | −42.602 | 1.19 | 1.90043 | 37.4 | 16.76 |
| 27 | 27.449 | 4.61 | 1.49700 | 81.5 | 18.25 |
| 28* | −35.506 | (variable) | | | 20.06 |
| 29 | −37.450 | 3.91 | 1.80400 | 46.6 | 33.33 |
| 30 | −26.117 | (variable) | | | 34.57 |
| image plane | ∞ | | | | |

ASPHERIC DATA second surface
K = −6.50224e−001  A 4 = −2.26253e−006  A 6 = −1.36539e−008  A 8 = 4.17689e−011
A10 = −1.02121e−013  A12 = 9.61672e−017  A14 = −3.27635e−020
fifth surface
K = 0.00000e+000  A 4 = −1.45366e−005  A 6 = 2.33063e−008  A 8 = −1.47648e−010
A10 = 4.06536e−013  A12 = −4.94409e−016  A14 = 2.18700e−019
twenty-eighth surface
K = 0.00000e+000  A 4 = 5.70397e−005  A 6 = 1.80760e−007  A 8 = 3.46568e−010
A10 = −2.14812e−011  A12 = 1.34782e−013  A14 = −3.65589e−016

VARIOUS DATA

| Zoom ratio | 1.88 | | |
|---|---|---|---|
| | Wide-angle | Middle | Telephoto |
| Focal length | 9.27 | 15.01 | 17.46 |
| F-number | 4.12 | 4.12 | 4.12 |
| Half angle of view | 66.80 | 55.24 | 51.10 |
| Image height | 21.64 | 21.64 | 21.64 |
| overall lens length | 137.95 | 129.32 | 129.39 |
| BF | 13.49 | 13.49 | 13.49 |
| d12 | 27.53 | 8.91 | 4.73 |
| d13 | 1.78 | 1.41 | 1.28 |
| d19 | 2.61 | 2.98 | 3.11 |
| d25 | 2.21 | 3.26 | 3.63 |
| d28 | 7.05 | 15.99 | 19.87 |
| d30 | 13.49 | 13.49 | 13.49 |
| entrance pupil position | 23.13 | 21.99 | 21.62 |
| exit pupil position | −55.50 | −85.94 | −103.07 |
| front principal position | 31.16 | 34.73 | 36.46 |
| rear principal position | 4.21 | −1.53 | −3.97 |

ZOOM LENS UNIT DATA

| Unit | Starting Surface | Focal length | overall lens length | front principal position | rear principal position |
|---|---|---|---|---|---|
| 1 | 1 | −16.50 | 46.61 | 10.20 | −32.36 |
| stop | 13 | ∞ | 0.00 | 0.00 | −0.00 |
| 2 | 14 | 71.73 | 10.96 | −3.43 | −9.04 |
| 3 | 20 | 29.42 | 16.01 | 0.14 | −10.38 |
| 4 | 26 | −49.28 | 5.81 | −2.12 | −6.13 |
| 5 | 29 | 93.04 | 3.91 | 6.21 | 4.33 |

Single lens data

| Lens | Starting surface | Focal length |
|---|---|---|
| 1 | 1 | −50.07 |
| 2 | 3 | −120.37 |
| 3 | 5 | −39.88 |
| 4 | 7 | −52.50 |
| 5 | 9 | −48.71 |
| 6 | 11 | 29.84 |
| 7 | 14 | −21.93 |
| 8 | 15 | 13.12 |
| 9 | 17 | −11.87 |
| 10 | 18 | 15.22 |
| 11 | 20 | −58.63 |
| 12 | 21 | 20.34 |
| 13 | 23 | −21.40 |
| 14 | 24 | 19.68 |
| 15 | 26 | −18.39 |
| 16 | 27 | 31.93 |
| 17 | 29 | 93.04 |

Numerical Example 5

UNIT mm
Surface data

| surface number | r | d | nd | vd | effective diameter |
|---|---|---|---|---|---|
| 1 | 50.321 | 2.90 | 1.61544 | 44.6 | 84.94 |
| 2* | 20.976 | 12.69 | | | 72.32 |
| 3* | 82.349 | 2.30 | 1.53775 | 74.7 | 67.92 |
| 4 | 29.492 | 6.15 | | | 47.48 |
| 5* | 31.456 | 2.10 | 2.00069 | 25.5 | 45.17 |
| 6 | 22.861 | 5.20 | | | 35.66 |
| 7 | 44.414 | 1.30 | 2.05090 | 26.9 | 35.18 |
| 8 | 21.405 | 9.21 | | | 30.36 |
| 9 | −45.664 | 1.15 | 1.59522 | 67.7 | 30.17 |
| 10 | 56.056 | 0.15 | | | 29.84 |
| 11 | 39.931 | 6.34 | 1.85478 | 24.8 | 30.10 |
| 12 | −77.347 | (variable) | | | 29.61 |
| 13(stop) | ∞ | (variable) | | | 17.64 |
| 14 | 31.834 | 0.65 | 1.95906 | 17.5 | 18.46 |
| 15 | 14.000 | 6.09 | 1.85025 | 30.1 | 18.15 |
| 16 | −240.881 | 0.87 | | | 18.07 |
| 17 | −41.593 | 0.65 | 1.88300 | 40.8 | 18.06 |
| 18 | 20.971 | 4.77 | 1.92286 | 20.9 | 18.61 |
| 19 | −109.959 | (variable) | | | 18.88 |
| 20 | 16.014 | 0.95 | 2.05090 | 26.9 | 19.34 |
| 21 | 12.492 | 7.56 | 1.49700 | 81.5 | 18.20 |
| 22 | −77.792 | 0.15 | | | 17.38 |
| 23 | 19.037 | 0.95 | 2.05090 | 26.9 | 16.12 |
| 24 | 10.689 | 6.81 | 1.49700 | 81.5 | 15.31 |
| 25 | 210.395 | (variable) | | | 16.37 |
| 26 | −67.490 | 1.18 | 1.90043 | 37.4 | 17.08 |
| 27 | 23.987 | 4.37 | 1.49700 | 81.5 | 18.38 |
| 28* | −72.489 | (variable) | | | 20.21 |

-continued

| | | | | | |
|---|---|---|---|---|---|
| 29 | −96.572 | 5.85 | 1.80400 | 46.6 | 41.09 |
| 30 | −37.459 | (variable) | | | 42.06 |
| image plane | ∞ | | | | |

ASPHERIC DATA second surface
K = −7.37337e−001  A 4 = −2.31563e−006  A 6 = −5.26130e−009  A 8 = 1.69229e−011
A10 = −4.97111e−014  A12 = 4.36407e−017  A14 = −1.23662e−020
third surface
K = 0.00000e+000  A 4 = −1.18734e−006  A 6 = 1.78311e−008  A 8 = −4.10347e−011
A10 = 5.59043e−014  A12 = −4.29720e−017  A14 = 1.38568e−020
fifth surface
K = 0.00000e+000  A 4 = −9.31815e−006  A 6 = −1.44590e−009  A 8 = −7.95301e−011
A10 = 2.28290e−013  A12 = −2.26814e−016  A14 = 5.83121e−020
twenty-eighth surface
K = 0.00000e+000  A4 = 5.12114e−005  A 6 = 2.76391e−008  A 8 = 2.27567e−009
A10 = −5.39353e−011  A12 = 4.15420e−013  A14 = −1.25628e−015

VARIOUS DATA

| Zoom ratio | 2.66 | | |
|---|---|---|---|
| | Wide-angle | Middle | Telephoto |
| Focal length | 9.01 | 18.07 | 24.00 |
| F-number | 4.12 | 4.12 | 4.12 |
| Half angle of view | 67.40 | 50.13 | 42.04 |
| Image height | 21.64 | 21.64 | 21.64 |
| overall lens length | 146.16 | 138.36 | 143.68 |
| BF | 11.45 | 11.45 | 11.45 |
| d12 | 31.10 | 6.48 | 0.73 |
| d13 | 0.94 | 1.07 | 0.93 |
| d19 | 2.75 | 2.62 | 2.75 |
| d25 | 2.22 | 3.31 | 3.67 |
| d28 | 7.33 | 23.06 | 33.77 |
| d30 | 11.45 | 11.45 | 11.45 |
| entrance pupil position | 25.89 | 24.29 | 23.68 |
| exit pupil position | −61.99 | −159.11 | −372.77 |
| front principal position | 33.79 | 40.45 | 46.18 |
| rear principal position | 2.45 | −6.62 | −12.54 |

ZOOM LENS UNIT DATA

| Unit | Starting Surface | Focal length | overall lens length | front principal position | rear principal position |
|---|---|---|---|---|---|
| 1 | 1 | −16.54 | 49.50 | 12.85 | −30.67 |
| stop | 13 | ∞ | 0.00 | 0.00 | −0.00 |
| 2 | 14 | 63.72 | 13.04 | −0.81 | −8.24 |
| 3 | 20 | 32.05 | 16.43 | −0.19 | −10.67 |
| 4 | 26 | −43.90 | 5.55 | −0.62 | −4.25 |
| 5 | 29 | 72.90 | 5.85 | 5.07 | 1.97 |

Single lens data

| Lens | Starting surface | Focal length |
|---|---|---|
| 1 | 1 | −60.73 |
| 2 | 3 | −86.76 |
| 3 | 5 | −95.26 |
| 4 | 7 | −40.49 |
| 5 | 9 | −42.10 |
| 6 | 11 | 31.60 |
| 7 | 14 | −26.53 |
| 8 | 15 | 15.73 |
| 9 | 17 | −15.71 |
| 10 | 18 | 19.42 |
| 11 | 20 | −62.71 |
| 12 | 21 | 22.28 |
| 13 | 23 | −24.63 |
| 14 | 24 | 22.40 |
| 15 | 26 | −19.54 |
| 16 | 27 | 36.82 |
| 17 | 29 | 72.90 |

TABLE 1

| | Conditional expression | Example 1 | Example 2 | Example 3 | Example 4 | Example 5 |
|---|---|---|---|---|---|---|
| (1) | $2.85 < D1/skw < 10.0$ | 3.379 | 4.775 | 3.149 | 3.456 | 4.322 |
| (2) | $-20 < TTDw/f1 < -6.2$ | −8.421 | −8.808 | −7.003 | −8.362 | −8.838 |
| (3) | $-4.0 < f1/fw < -1.0$ | <1.768 | −1.885 | <1.935 | −1.779 | −1.836 |
| (4) | $1.5 < frw/fw < 6.0$ | 3.378 | 3.654 | 2.809 | 3.430 | 3.598 |
| (5) | $1.5 < frp/fw < 20$ | 9.163 | 8.663 | 2.809 | 10.035 | 8.095 |
| (6) | $2 < POw/tw < 15$ | 7.513 | 8.085 | 4.467 | 7.440 | 8.156 |
| (7) | $1.3 < fg1/f1 < 6$ | 3.293 | 3.055 | 2.845 | 3.035 | 3.672 |
| (8) | $0.01 < (\Sigma Aspi \times Ndi)/D1 < 0.5$ | 0.088 | 0.105 | 0.083 | 0.087 | 0.133 |
| | f1 | −16.27837 | −15.08633 | −19.34822 | −16.498 | −16.5373 |
| | f2 | 56.59778 | 72.86809 | 28.0862 | 71.729 | 6.371822 |
| | f3 | 61.94195 | 43.12598 | — | 29.416 | 32.05195 |
| | f4 | 84.9481 | 69.31229 | — | −49.285 | −43.89797 |
| | f5 | — | — | — | 93.041 | 72.8994 |
| | TTDw | 137.084 | 132.886 | 135.491 | 137.946 | 146.156 |
| | D1 | 45.592 | 47.734 | 44.693 | 46.607 | 49.497 |
| | fw | 9.271 | 8.001 | 9.999 | 9.272 | 9.005 |
| | ft | 17.460 | 16.000 | 17.458 | 17.460 | 23.999 |
| | skw | 13.494 | 9.996 | 14.194 | 13.485 | 11.453484 |
| | frw | 31.314 | 29.239 | 28.086 | 31.805 | 32.398 |
| | fg1 | −53.607 | −46.091 | −51.197 | −50.074 | −60.732 |
| | POw | 69.654 | 64.692 | 44.669 | 68.986 | 73.445 |
| | $\Sigma Aspi \times Ndi$ | 4.008 | 5.009 | 3.718 | 4.041 | 6.592 |

TABLE 2

| | | first negative meniscus lens | | | | |
|---|---|---|---|---|---|---|
| | | object side: SS image side: AS | object side: AS image side: AS | object side: SS image side: AS | object side: SS image side: AS | object side: SS image side: AS |
| | Nd1 | 1.804 | 1.772 | 1.804 | 1.804 | 1.615 |
| object-side surface | Asp11 | 0 | 0.682 | 0 | 0 | 0 |
| | Asp11 × Nd11 | 0 | 1.209 | 0 | 0 | 0 |
| image-side surface | Asp12 | 2.674 | 2.697 | 2.473 | 2.641 | 4.114 |
| | Asp12 × Nd12 | 4.824 | 4.780 | 4.461 | 4.764 | 6.646 |
| | | second negative menisus lens | | | | |
| | | object side: SS image side: SS | object side: SS image side: SS | object side: SS image side: SS | object side: SS image side: SS | object side: AS image side: SS |
| | Nd2 | 1.439 | 1.439 | 1.497 | 1.497 | 1.538 |
| object-side surface | Asp21 | 0 | 0 | 0 | 0 | 0.812 |
| | Asp21 × Nd2 | 0 | 0 | 0 | 0 | 1.249 |
| image-side surface | Asp22 | 0 | 0 | 0 | 0 | 0 |
| | Asp22 × Nd2 | 0 | 0 | 0 | 0 | 0 |
| | | third negative menisus lens | | | | |
| | | object side: AS image side: SS | object side: AS image side: SS | object side: AS image side: SS | object side: AS image side: SS | object side: AS image side: SS |
| | Nd3 | 2.001 | 2.00069 | 2.001 | 2.001 | 2.001 |
| object-side surface | Asp31 | −0.408 | −0.490 | −0.371 | −0.362 | −0.652 |
| | Asp31 × Nd3 | −0.816 | −0.980 | −0.743 | −0.723 | −1.304 |
| image-side surface | Asp32 | 0 | 0 | 0 | 0 | 0 |
| | Asp32 × Nd3 | 0 | 0 | 0 | 0 | 0 |

Image Pickup Apparatus

Figure 12:
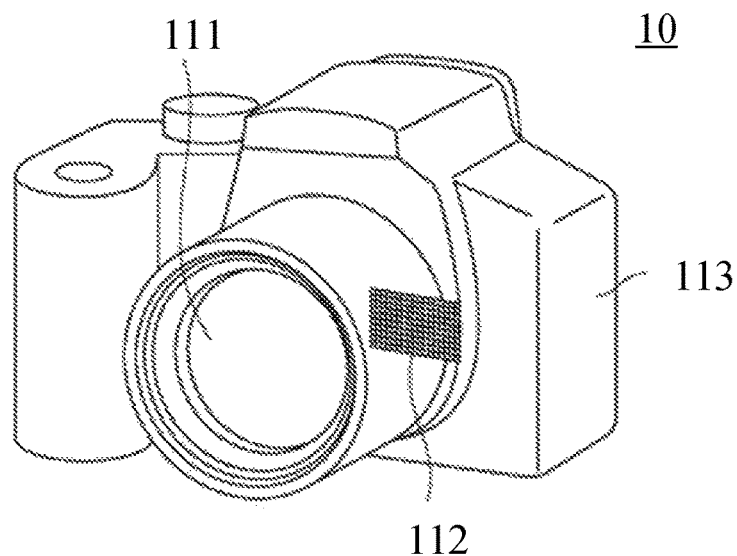
FIG. 12 is a schematic diagram of an image pickup apparatus including the zoom lens according to each example.

Referring now to FIG. 12, a description will be given of an illustrative digital still camera (image pickup apparatus 10) using a zoom lens according to each example as an imaging optical system. FIG. 12 is a schematic diagram of the image pickup apparatus 10 including the zoom lens according to each example.

In FIG. 12, reference numeral 113 denotes a camera body, and reference numeral 111 denotes an imaging optical system including any of the zoom lenses 1a to 1e according to Examples 1 to 5. Reference numeral 112 denotes an image sensor (photoelectric conversion element) such as a CCD sensor or a CMOS sensor which is built in the camera body 113 and receives light from the imaging optical system 111 (optical image formed by the imaging optical system 111) and photoelectrically converts it. The camera body 113 may be a so-called single lens reflex camera having a quick turn mirror or a so-called mirrorless camera having no quick turn mirror.

Each example can provide a compact zoom lens and an image pickup apparatus, each of which has a wide angle of view and a high optical performance over the entire zoom range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-177968, filed on Sep. 27, 2019, which is hereby incorporated by reference herein in its entirety.

What is claimed is:

1. A zoom lens consisting of, in order from an object side to an image side:
    a first lens unit having a negative refractive power; and
    a rear lens group having one or more lens units and having a positive refractive power as a whole,
    wherein intervals between adjacent lens units change during zooming,
    wherein the first lens unit has at least three meniscus lenses each having a negative refractive power and a convex shape toward the object side,
    wherein at least one of the at least three meniscus lenses includes an aspherical surface having a positive aspherical amount, and
    wherein the following conditional expressions are satisfied:

$2.85 < D1/skw < 10.00$ $-20.0 < TTDw/f1 < -6.2$ where D1 is a thickness of the first lens unit on an optical axis, skw is a distance on the optical axis from a surface closest to an image plane of the zoom lens to the image plane at a wide-angle end, TTDw is a distance on the optical axis from a surface closest to an object of the zoom lens to the image surface at the wide-angle end, and f1 is a focal length of the first lens unit.

2. The zoom lens according to claim 1, wherein the following conditional expression is satisfied:

$-4.0 < f1/fw < -1.0$ where fw is a focal length of the zoom lens at the wide-angle end.

3. The zoom lens according to claim 1, wherein the following conditional expression is satisfied:

$1.5 < frw/fw < 6.0$ where frw is a focal length of the rear lens group at the wide-angle end, and fw is a focal length of the zoom lens at the wide-angle end.

4. The zoom lens according to claim 1, wherein the following conditional expression is satisfied:

$1.5 < frp/fw < 20.0$ where frp is a focal length of a lens unit having a positive refractive power closest to the object in the rear lens group, and fw is a focal length of the zoom lens at the wide-angle end.

5. The zoom lens according to claim 1, wherein the following conditional expression is satisfied:

$2.0 < POw/fw < 15.0$ where POw is a distance on the optical axis from the image plane to an exit pupil at the wide-angle end, and fw is a focal length of the zoom lens at the wide-angle end.

6. The zoom lens according to claim 1, wherein the following conditional expression is satisfied:

$1.3 < fg1/f1 < 6.0$ where fg1 is a focal length of a lens closest to the object in the zoom lens.

7. The zoom lens according to claim 1, wherein the following conditional expression is satisfied:

$0.01 < (\Sigma Aspi \times Ndi)/D1 < 0.5$ where Aspi an aspherical amount of an i-th meniscus lens counted from the object side in the at least three meniscus lenses, and Ndi is a refractive index of the i-th meniscus lens.

8. The zoom lens according to claim 1, wherein the rear lens group includes a second lens unit configured to move during focusing.

9. The zoom lens according to claim 1, wherein the at least three meniscus lenses include three meniscus lenses disposed consecutively from the object side.

10. The zoom lens according to claim 1, wherein a meniscus lens disposed closest to an object has the aspherical surface in the at least three meniscus lenses.

11. The zoom lens according to claim 10, wherein the image side surface of the meniscus lens disposed closest to the object is the aspherical surface.

12. The zoom lens according to claim 1, wherein the rear lens group includes, in order from the object side to the image side, a second lens unit having a positive refractive power, a third lens unit having a positive refractive power, and a fourth lens unit having a positive refractive power.

13. The zoom lens according to claim 1, wherein the rear lens group includes, in order from the object side to the image side, a second lens unit having a positive refractive power, a third lens unit having a positive refractive power, a fourth lens unit having a positive refractive power, and a fifth lens unit having a positive refractive power.

14. An image pickup apparatus comprising:
    a zoom lens according to claim 1; and
    an image sensor configured to receive light from the zoom lens.

* * * * *